(12) United States Patent
Hirakami et al.

(10) Patent No.: US 10,081,846 B2
(45) Date of Patent: *Sep. 25, 2018

(54) STEEL WIRE

(71) Applicant: NIPPON STEEL & SUMITOMO METAL CORPORATION, Tokyo (JP)

(72) Inventors: Daisuke Hirakami, Kisarazu (JP); Makoto Okonogi, Chiba (JP)

(73) Assignee: NIPPON STEEL & SUMITOMO METAL CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/115,952

(22) PCT Filed: Feb. 6, 2015

(86) PCT No.: PCT/JP2015/053387
§ 371 (c)(1),
(2) Date: Aug. 2, 2016

(87) PCT Pub. No.: WO2015/119247
PCT Pub. Date: Aug. 13, 2015

(65) Prior Publication Data
US 2017/0166992 A1 Jun. 15, 2017

(30) Foreign Application Priority Data
Feb. 6, 2014 (JP) .................... 2014-021684

(51) Int. Cl.
C22C 38/00 (2006.01)
C21D 9/52 (2006.01)
(Continued)

(52) U.S. Cl.
CPC ............. *C21D 9/52* (2013.01); *B60C 9/0007* (2013.01); *C22C 38/001* (2013.01);
(Continued)

(58) Field of Classification Search
CPC ... B60C 9/0007; C21D 9/52; C21D 2211/009; D07B 2205/3035; D07B 1/066;
(Continued)

(56) References Cited

U.S. PATENT DOCUMENTS

| 5,208,434 A | 5/1993 | Minamida et al. |
| 5,248,353 A | 9/1993 | Nishida et al. |

(Continued)

FOREIGN PATENT DOCUMENTS

| CN | 1272890 A | 11/2000 |
| CN | 1746187 A | 3/2006 |

(Continued)

OTHER PUBLICATIONS

Watanabe, Jun; Description JP 2011-219829; Nov. 4, 2011.*
(Continued)

*Primary Examiner* — David R Sample
*Assistant Examiner* — Mary I Omori
(74) *Attorney, Agent, or Firm* — Birch, Stewart, Kolasch & Birch, LLP

(57) ABSTRACT

A steel wire according to an aspect of the present invention includes a predetermined chemical composition, in which a wire diameter R of the steel wire is 1.0 mm to 3.5 mm, a soft portion is formed along an outer circumference of the steel wire, the Vickers hardness of the soft portion is lower than that of a position of the steel wire at a depth of ¼ of the wire diameter R by Hv 30 or higher, the thickness of the soft portion is 5 μm to 0.1×R mm, the metallographic structure of a center portion of the steel wire contains 95% to 100% of pearlite by area %, the average lamellar spacing of pearlite in a portion from a surface of the steel wire to a depth of 5 μm is less than that of pearlite at the center of the steel wire, the difference between the average lamellar spacing of pearlite in the portion from the surface of the steel (Continued)

wire to the depth of 5 μm and the average lamellar spacing of pearlite at the center of the steel wire is 3 nm to 60 nm, and the tensile strength is 1100 MPa or higher.

9 Claims, 7 Drawing Sheets

(51) Int. Cl.

| | |
|---|---|
| B60C 9/00 | (2006.01) |
| C22C 38/28 | (2006.01) |
| C22C 38/22 | (2006.01) |
| C22C 38/20 | (2006.01) |
| C22C 38/16 | (2006.01) |
| C22C 38/14 | (2006.01) |
| C22C 38/12 | (2006.01) |
| C22C 38/06 | (2006.01) |
| C22C 38/04 | (2006.01) |
| C22C 38/02 | (2006.01) |
| C22C 38/32 | (2006.01) |
| C22C 38/30 | (2006.01) |
| C22C 38/26 | (2006.01) |
| C22C 38/24 | (2006.01) |
| C22C 38/10 | (2006.01) |
| D07B 1/06 | (2006.01) |
| D02G 3/48 | (2006.01) |

(52) U.S. Cl.
CPC ............ *C22C 38/002* (2013.01); *C22C 38/02* (2013.01); *C22C 38/04* (2013.01); *C22C 38/06* (2013.01); *C22C 38/10* (2013.01); *C22C 38/12* (2013.01); *C22C 38/14* (2013.01); *C22C 38/16* (2013.01); *C22C 38/20* (2013.01); *C22C 38/22* (2013.01); *C22C 38/24* (2013.01); *C22C 38/26* (2013.01); *C22C 38/28* (2013.01); *C22C 38/30* (2013.01); *C22C 38/32* (2013.01); *D02G 3/48* (2013.01); *D07B 1/066* (2013.01); *C21D 2211/009* (2013.01); *D07B 2201/2014* (2013.01); *D07B 2205/3035* (2013.01); *D07B 2205/3053* (2013.01)

(58) Field of Classification Search
CPC ....... C22C 38/01; C22C 38/02; C22C 38/002; C22C 38/04; C22C 38/06; C22C 38/10; C22C 38/12; C22C 38/14; C22C 38/16; C22C 38/20; C22C 38/22; C22C 38/24; C22C 38/28; C22C 38/30; C22C 38/32
USPC ......................................................... 428/684
See application file for complete search history.

(56) References Cited

U.S. PATENT DOCUMENTS

| | | | |
|---|---|---|---|
| 2010/0126643 A1 | 5/2010 | Yamasaki et al. | |
| 2011/0168302 A1* | 7/2011 | Takahashi | C21D 8/065 148/598 |
| 2012/0318410 A1 | 12/2012 | Tarui et al. | |
| 2013/0263975 A1* | 10/2013 | Yamasaki | C21D 8/06 148/505 |

FOREIGN PATENT DOCUMENTS

| | | | | |
|---|---|---|---|---|
| CN | 101765672 A | 6/2010 | | |
| CN | 102292460 A | 12/2011 | | |
| EP | 0 218 167 A1 | 4/1987 | | |
| EP | 1 528 115 A1 | 5/2005 | | |
| EP | 2175043 A1 | 4/2010 | | |
| JP | 62-077418 A | 4/1987 | | |
| JP | 4-280915 A | 10/1992 | | |
| JP | 8-053737 A | 2/1996 | | |
| JP | 10-287955 A | 10/1998 | | |
| JP | 3001572 B1 | 1/2000 | | |
| JP | 2000-256792 A | 9/2000 | | |
| JP | 2001-181790 A | 7/2001 | | |
| JP | 2003171737 | * | 12/2001 | ............... C21D 9/52 |
| JP | 2005-036356 A | 2/2005 | | |
| JP | 2005-054260 A | 3/2005 | | |
| JP | 2010-270391 A | 12/2010 | | |
| JP | 2011-219829 A | 11/2011 | | |
| JP | 2011219829 | * | 11/2011 | ............... B21C 1/00 |
| JP | 5114684 B2 | 1/2013 | | |
| JP | 5315790 B2 | 10/2013 | | |
| WO | WO 2011/089782 A1 | 7/2011 | | |

OTHER PUBLICATIONS

Murakami, Toshio; Description 2003-171737; Dec. 7, 2001.*
Watanabe; Machine translation JP 2011-219829 Description; Nov. 4, 2011 (Year: 2011).*
International Search Report (PCT/ISA/210) issued in PCT/JP2015/053387, dated Apr. 7, 2015.
Written Opinion (PCT/ISA/237) issued in PCT/JP2015/053387, dated Apr. 7, 2015.
Japanese Office Action, dated Jul. 18, 2017 for corresponding Japanese Application No. 2015-561057, with English translation.
Japanese Office Action, dated Jul. 16, 2017 for related Japanese Application No. 2015-561053, with English translation.
Chinese Office Action and Search Report issued in Chinese Application No. 201580007165.4, dated May 10, 2017, together with an English translation.
Chinese Office Action and Search Report issued in Chinese Application No. 201580007167.3, dated May 3, 2017, with English translation.
English translation of Written Opinion of the International Searching Authority, dated Apr. 7, 2015, issued in PCT/JP2015/053367 (Form PCT/ISA/237).
European Extended Search Report dated Jun. 23, 2017, issued in European Patent Application No. 15746084.1.
International Search Report issued in PCT/JP2015/053367, dated Apr. 7, 2015 (form PCT/ISA/210).
Korean Office Action, dated Aug. 17, 2017, for Korean Patent Application No. 10-2016-7021062, with English translation.

* cited by examiner

STEEL WIRE

TECHNICAL FIELD OF THE INVENTION

The present invention relates to a steel wire as a material of a high-strength steel cord which is used as a reinforcing material of a rubber product such as an automobile tire, a high-pressure rubber hose, or a conveyor belt.

Priority is claimed on Japanese Patent Application No. 2014-021684, filed on Feb. 6, 2014, the content of which is incorporated herein by reference.

RELATED ART

For example, in a rubber product such as an automobile tire, a chemical fiber such as rayon, nylon, or polyester, or a steel cord formed of a steel wire is used as a reinforcing material. These reinforcing materials play a role as a framework of an automobile tire, which have a large effect on the fuel consumption, high-speed durability, and driving stability of a vehicle on which the automobile tire is mounted. Recently, from the viewpoint of improving these characteristics, the use frequency of a steel cord as a reinforcing material has increased.

Here, for example, as disclosed in Patent Documents 1 and 2, a steel cord having a stranded wire structure in which a plurality of steel wires (filaments) are stranded has been widely proposed. Such a steel cord is manufactured through the following steps. First, dry drawing is performed on a wire rod having a wire diameter of 5 mm to 6 mm to obtain a steel wire having a wire diameter of about 1.0 mm to 4.0 mm. A heat treatment called a patenting treatment is performed on this steel wire to soften the steel wire. A brass plating is formed on a surface of the softened steel wire, and wet drawing (finish drawing) is performed on the steel wire. As a result, a filament having a wire diameter of about 0.1 mm to 0.5 mm is obtained. By stranding filaments obtained as described above, a steel cord having a stranded wire structure is manufactured. The brass plating is formed to improve adhesion between rubber and the steel cord.

PRIOR ART DOCUMENT

Patent Document

[Patent Document 1] Japanese Unexamined Patent Application, First Publication No. 2005-054260
[Patent Document 2] Japanese Unexamined Patent Application, First Publication No. 2005-036356

DISCLOSURE OF THE INVENTION

Problems to be Solved by the Invention

As described above, during the manufacturing of a steel cord, wet drawing (finish drawing) and stranding are performed on a steel wire having a wire diameter of about 1.0 mm to 4.0 mm. Therefore, good workability is required for a steel wire for a steel cord. On the other hand, recently, from the viewpoint of reducing the environmental burden, the weight of an automobile tire has been reduced in order to reduce the fuel consumption of an automobile. Accordingly, high-strengthening is required for a steel cord and a filament for a steel cord.

However, in a case where the strength of a steel wire is improved in order to form a high-strength steel cord and a high-strength filament for a steel cord, the ductility of the steel wire is insufficient, and the workability of the steel wire deteriorates. Therefore, the steel wire on which high-strengthening is performed has a problem in that defects such as cracking may occur during wet drawing (finish drawing) and stranding. In addition, in a case where the strength of a steel wire is high, stranding cannot be performed favorably, and stranding defects may occur. As described above, in the related art, a steel wire for a steel cord having high strength and good workability at the same time cannot be obtained, and a high-strength steel cord cannot be stably manufactured.

The present invention has been made in consideration of the above-described circumstances, and an object thereof is to provide a high-strength steel wire with which a steel cord having high strength and good workability can be stably manufactured.

Means for Solving the Problem

The summary of the present invention for solving the above-described problems is as follows.

(1) According to an aspect of the present invention, there is provided a steel wire including, as a chemical composition, by mass %, C: 0.70% to 1.20%, Si: 0.15% to 0.60%, Mn: 0.10% to 1.00%, N: 0.0010% to 0.0050%, Al: 0% to 0.010%, Ti: 0% to 0.10%, Cr: 0% to 0.50%, Co: 0% to 0.50%, V: 0% to 0.50%, Cu: 0% to 0.20%, Nb: 0% to 0.100%, Mo: 0% to 0.20%, W: 0% to 0.200%, B: 0% to 0.0030%, REM: 0% to 0.0050%, Ca: 0% to 0.0050%, Mg: 0% to 0.0050%, Zr: 0% to 0.0100%, and a remainder including Fe and impurities, in which a wire diameter R of the steel wire is 1.0 mm to 3.5 mm, a soft portion is formed along an outer circumference of the steel wire, the Vickers hardness of the soft portion is lower than that of a position of the steel wire at a depth of ¼ of the wire diameter R by Hv 30 or higher, the thickness of the soft portion is 5 μm to 0.1×R mm, the metallographic structure of the steel wire other than the soft portion contains 95% to 100% of pearlite by area %, the average lamellar spacing of the pearlite in a portion from a surface of the steel wire to a depth of 5 μm is less than that of the pearlite at the center of the steel wire, a difference between the average lamellar spacing of the pearlite in the portion from the surface of the steel wire to the depth of 5 μm and the average lamellar spacing of the pearlite at the center of the steel wire is 3 nm to 60 nm, and a tensile strength is 1100 MPa or higher.

(2) In the steel wire according to (1), the thickness of the soft portion may be 10 μm to 0.08×R mm.

(3) In the steel wire according to (1) or (2), the difference between the average lamellar spacing in the region from the surface of the steel wire to the depth of 5 μm and the average lamellar spacing of the center of the steel wire may be 40 nm or less.

(4) The steel wire according to any one of (1) to (3) may further include, as the chemical composition, by mass %, one element or two or more elements selected from the group consisting of Ti: 0.005% to 0.10%, Cr: more than 0% to 0.50%, Co: more than 0% to 0.50%, V: more than 0% to 0.50%, Cu: more than 0% to 0.20%, Nb: more than 0% to 0.100%, Mo: more than 0% to 0.20%, W: more than 0% to 0.20%, B: more than 0% to 0.0030%, REM: more than 0% to 0.0050%, Ca: more than 0.0005% to 0.0050%, Mg: more than 0.0005% to 0.0050%, and Zr: more than 0.0005% to 0.0100%.

Effects of the Invention

The steel wire having the above-described configuration includes a soft portion, in which the soft portion has a smaller average lamellar spacing than the center portion of the steel wire, and a difference between the average lamellar spacing of the center portion of the steel wire and the average lamellar spacing of the region from the surface of the steel wire to a depth of 5 µm is 60 nm or less. In addition, the Vickers hardness of the soft portion of the steel wire having the above-described configuration is lower than that of the steel wire at a depth of ¼ of the wire diameter R by Hv 30 or higher. As the Vickers hardness decreases, the ductility increases. The present inventors found that, in the steel wire including the soft portion on the surface thereof, the tensile strength is improved due to the center portion having a high hardness, and the ductility is significantly improved due to the soft portion having a low hardness. Further, the present inventors found that, by allowing the average lamellar spacing of pearlite in the portion from the surface of the steel wire to a depth of 5 µm to be less than that of pearlite at the center of the steel wire, the thickness of cementite in the pearlite structure is reduced, and the cracking of cementite which causes wire breaking is small. In finish drawing and stranding, the soft portion of the steel wire is mainly deformed. Good workability is required for a steel wire for a steel cord. According to the above-described configuration, the occurrence of defects such as cracking in the steel wire can be suppressed in the finish drawing and the stranding. The stranding can be performed favorably on the steel wire including the above-described steel wire. Therefore, due to the above-described configuration, a high-quality steel cord in which the occurrence of stranding defects is suppressed can be provided.

In addition, the steel wire having the above-described configuration includes, as a chemical composition, by mass %, C: 0.70% to 1.20%, Si: 0.15% to 0.60%, Mn: 0.10% to 1.00%, N: 0.0010% to 0.0050%, Al: 0% to 0.010%, Ti: 0% to 0.10%, Cr: 0% to 0.50%, Co: 0% to 0.50%, V: 0% to 0.50%, Cu: 0% to 0.20%, Nb: 0% to 0.100%, Mo: 0% to 0.20%, W: 0% to 0.200%, B: 0% to 0.0030%, REM: 0% to 0.0050%, Ca: 0% to 0.0050%, Mg: 0% to 0.0050%, Zr: 0% to 0.0100%, and a remainder including Fe and impurities, in which a metallographic structure of the center portion of the steel wire contains 95% to 100% of a pearlite structure by area %. The center portion of the steel wire having the above-described configuration has a sufficiently high tensile strength. Accordingly, when the steel wire having the above-described configuration is used, the weight of a steel cord can be reduced.

In addition, the thickness of the soft portion of the steel wire having the above-described configuration is 5 µm to 0.1×R mm. As described above, R refers to the diameter of the steel wire (wire diameter). Since the thickness of the soft portion is 5 µm or more, the steel wire having the above-described configuration has sufficiently good workability, and the occurrence of defects such as cracking can be suppressed in finish drawing and stranding. In addition, since the thickness of the soft portion is 0.1×R mm or less, the tensile strength of the steel wire having the above-described configuration is maintained to be high, and the strength of a steel cord can be sufficiently secured. The thickness of the soft portion is the thickness of a region having a Vickers hardness which is lower than that of the steel wire at a depth of ¼ of the wire diameter R by Hv 30 or higher.

According to the present invention, it is possible to provide a steel wire having high strength and good workability, with which a high-strength steel cord can be stably manufactured.

EMBODIMENT OF THE INVENTION

Hereinafter, a steel wire according to an embodiment of the present invention will be described with reference to the accompanying drawings. A steel wire 10 according to the embodiment is used as a raw material during the manufacturing of a high-strength steel cord which is used as a reinforcing material of a rubber product such as an automobile tire.

The steel wire 10 according to the embodiment has a wire diameter R which satisfies 1.0 mm≤R≤3.5 mm, and includes as a chemical composition, by mass %, C: 0.70% to 1.20%, Si: 0.15% to 0.60%, Mn: 0.10% to 1.00%, N: 0.0010% to 0.0050%, Al: 0% to 0.010%, Ti: 0% to 0.10%, Cr: 0% to 0.50%, Co: 0% to 0.50%, V: 0% to 0.50%, Cu: 0% to 0.20%, Nb: 0% to 0.100%, Mo: 0% to 0.20%, W: 0% to 0.200%, B: 0% to 0.0030%, REM: 0% to 0.0050%, Ca: 0% to 0.0050%, Mg: 0% to 0.0050%, Zr: 0% to 0.0100%, and a remainder including Fe and impurities.

Figure 1:
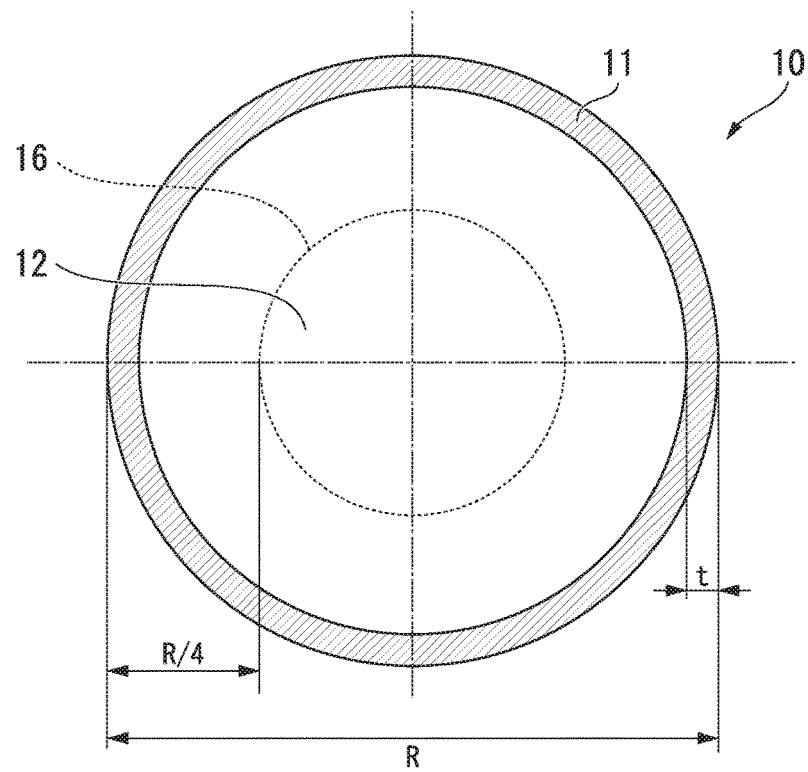
FIG. 1 is a C cross-sectional view of a steel wire according to the embodiment.

As shown in FIG. 1, the steel wire 10 according to the embodiment includes a soft portion 11 and a center portion 12. The soft portion 11 is formed along an outer circumference of the steel wire 10. The Vickers hardness of the soft portion 11 is lower than that of the steel wire 10 at a depth of ¼ of the wire diameter R by Hv 30 or higher. The thickness of the soft portion is 5 µm to 0.1×R mm. Further, the average lamellar spacing of pearlite in a region from a surface of the steel wire 10 to a depth of 5 µm is less than that of pearlite at the center of the steel wire 10. The difference between the average lamellar spacing of pearlite in the region from the surface of the steel wire 10 to a depth of 5 µm and the average lamellar spacing of pearlite at the center of the steel wire 10 is 3.0 nm to 60.0 nm. Further, the tensile strength of the steel wire 10 is 1100 MPa or higher.

(Hardness of Soft Portion 11: Lower than Vickers Hardness of Steel Wire at Depth of ¼ of Wire Diameter R by Hv 30 or Higher)

As shown in FIG. 1, the steel wire 10 according to the embodiment includes the soft portion 11 that is formed along an outer circumference of the steel wire 10. In the steel wire 10 according to the embodiment, a region having a Vickers hardness, which is lower than that of the steel wire at a depth of ¼ of the wire diameter R by Hv 30 or higher, is defined as the soft portion 11. That is, the Vickers hardness of the soft portion 11 is lower than that of the steel wire at a depth of ¼ of the wire diameter R by Hv 30 or higher. In FIG. 1, a broken line indicated by reference numeral 16 represents the portion of the steel wire at a depth of ¼ of the wire diameter R. In addition, a portion of the steel wire 10 according to the embodiment other than the soft portion 11 is defined as the center portion 12. The difference between the hardness of the soft portion 11 and the hardness of the center portion 12 is derived from a difference in dislocation density and a difference in cementite morphology. A metallographic structure of the center portion 12 contains 95% to 100% of pearlite, and a metallographic structure of the soft portion 11 also contains the same amount of pearlite as above. However, the majority of dislocations which are introduced into the metallographic structure after pearlite transformation are removed in the soft portion 11. The soft portion 11 has a lower hardness than the center portion 12 and thus has a higher ductility than the center portion 12.

(Thickness of Soft Portion 11: 5 µm to 0.1×R Mm)

A thickness t of the soft portion 11 of the steel wire 10 according to the embodiment is within a range of 5 µm≤t≤0.1×R mm. That is, in the steel wire 10 according to the embodiment, a region having a Vickers hardness, which is lower than that of a portion 16 at a depth of ¼ of the wire diameter R by Hv 30 or higher, is formed in a region from an outer circumferential surface of the steel wire 10 to the depth t. For example, in a case where the wire diameter R is 3.0 mm, the thickness t of the soft portion 11 is 5 µm to 0.3 mm (300 µm). The soft portion 11 having a higher ductility than the center portion 12 is formed along the outer circumference of the steel wire 10. Therefore, the steel wire 10 exhibits good workability during finish drawing and stranding during which significant deformation is applied mainly to the outer circumference. On the other hand, since the center portion 12 has a sufficiently high hardness, the steel wire 10 has a high tensile strength of 1100 MPa or higher. In a case where the thickness t of the soft portion 11 is 5 µm or less, working defects such as wire breaking are likely to occur during finish drawing, stranding, and the like. In addition, in a case where the thickness t of the soft portion 11 exceeds 0.1×R mm, the tensile strength decreases. Accordingly, the thickness t of the soft portion 11 is within a range of 5 µm≤t≤0.1×R mm. A preferable range of the thickness t of the soft portion 11 is 10 µm to 0.08×R mm.

Figure 2:
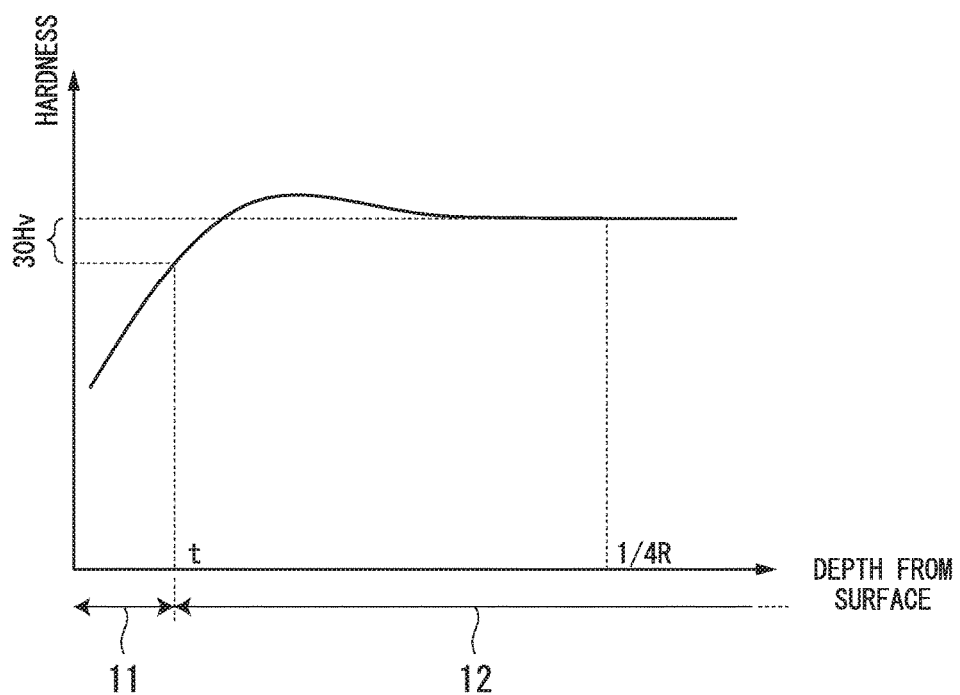
FIG. 2 is a graph schematically showing a hardness distribution of the steel wire according to the embodiment.

A method of measuring the thickness of the soft portion 11 of the steel wire 10 according to the embodiment is not particularly limited. For example, the thickness of the soft portion 11 can be determined from a hardness distribution of the steel wire 10 in a depth direction which is obtained by measuring the hardness of the steel wire 10. For example, a cut surface (C cross-section), which is obtained by cutting the steel wire 10 in a direction perpendicular to a drawing direction, is appropriately prepared, and the hardness is continuously measured from an outer circumference to the center of the cut surface. As a result, as shown in FIG. 2, a graph shows a relationship between a depth and a hardness of the steel wire 10. From this graph, the thickness of the region having a Vickers hardness, which is lower than that of the steel wire 10 at a depth of ¼ of the wire diameter R by Hv 30 or higher, can be obtained.

Figure 3:
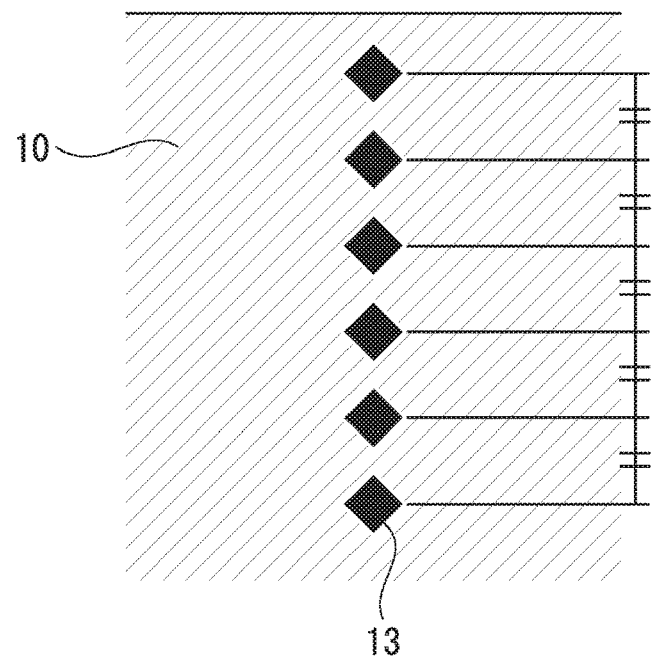
FIG. 3 is a diagram showing an example of a method of creating a hardness distribution graph of the steel wire according to the embodiment.
Figure 4:
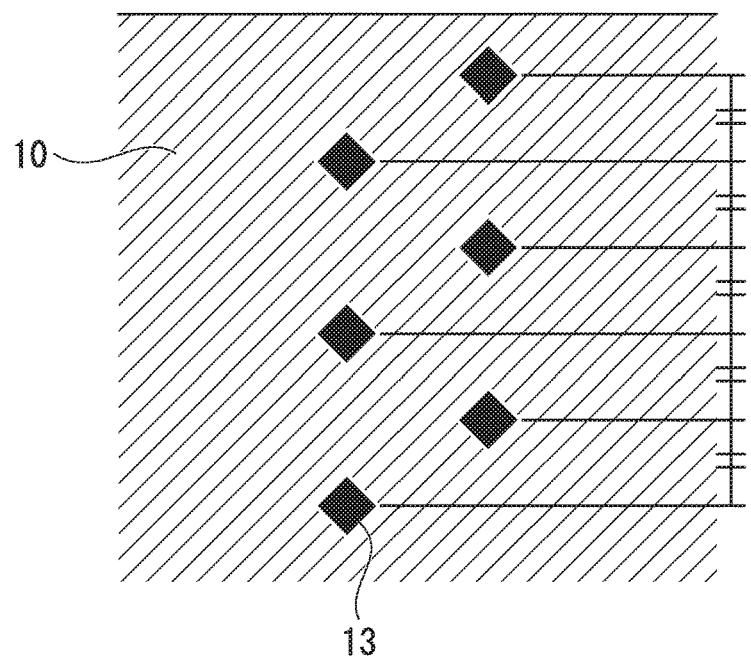
FIG. 4 is a diagram showing an example of a method of creating a hardness distribution graph of the steel wire according to the embodiment.
Figure 5:
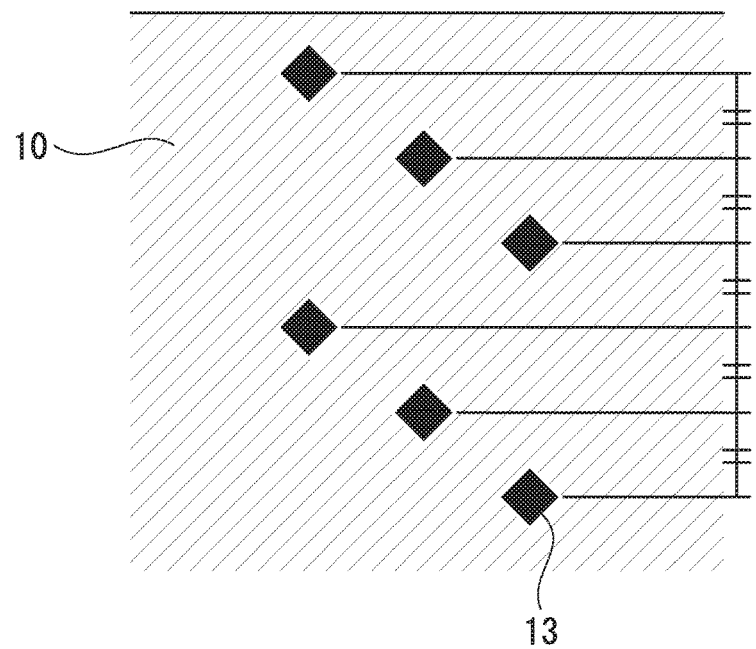
FIG. 5 is a diagram showing an example of a method of creating a hardness distribution graph of the steel wire according to the embodiment.

In order to improve the measurement accuracy of the thickness of the soft portion 11, it is preferable to increase the number of hardness measurement points. On the other, in a case where the Vickers hardness measurement is performed on one sample multiple times, it is necessary to separate the measurement points from each other at a distance which is about two times or more the length of a diagonal line of an indentation 13 which is formed at a measurement point. In the previous measurement, the indentation 13 is formed, which causes an increase in the hardness in the vicinity of the indentation 13. Therefore, in a case where the next measurement is performed on a region near the indentation 13 formed in the previous measurement, an accurate measurement value cannot be obtained. In order to increase the number of measurement points, the measurement points can be set as shown in FIG. 4 or FIG. 5. Typically, when the hardness distribution in the depth direction is measured, the measurement is continuously performed along one straight line from the outer circumference to the center of the steel wire 10 (refer to FIG. 3). The above-described measurement can improve the measurement efficiency. However, when the depth of the soft portion 11 of the steel wire 10 according to the embodiment is determined, it is preferable that the measurement is performed along a plurality of straight lines from the outer circumference to the center of the steel wire 10 as shown in FIG. 4 or FIG. 5. As a result, the number of measurement points can be increased without narrowing the distance between the measurement points. In addition, in order to increase the number of measurement points, the hardness measurement may be performed on a cross-section which is obtained by cutting the steel wire 10 at an angle of 30° with respect to the drawing direction. The hardness can be obtained at a depth interval of 1 µm by performing the hardness measurement along a major axis of the cross-section at a distance of 2 µm between the measurement points. In order to measure the depth of the soft portion 11 of the steel wire 10 according to the embodiment with sufficiently high accuracy, it is preferable that the depth interval in the hardness measurement is 1 µm or less. In addition, in order to achieve the above-described depth interval, it is preferable to appropriately adjust a method of setting a load or a measurement point, a method of obtaining a measurement surface, and the like in the Vickers hardness measurement.

(Metallographic Structure of Center Portion of Steel Wire: Containing 95 Area % to 100 Area % of Pearlite)

A metallographic structure of the center portion 12 of the steel wire 10 according to the embodiment (that is, the metallographic structure of the steel wire 10 other than the soft portion 11) contains 95% to 100% of pearlite by area ratio. It is necessary that the metallographic structure of the center portion 12 contains 95% or higher of pearlite in order to control the tensile strength of the steel wire 10 to be 1100 MPa or higher and to improve the workability of the steel wire 10 in a finish drawing S07 or the like described below. It is preferable that the amount of pearlite be large. Therefore, the upper limit value of the amount of pearlite in the center portion 12 of the steel wire 10 is 100%. Metallographic structures other than pearlite such as martensite, bainite, cementite, or degenerate pearlite may be contained as long as the amount of pearlite satisfies a predetermined value. Degenerate pearlite is a metallographic structure including granular cementite and granular ferrite. Degenerate pearlite is distinguished from typical pearlite (pearlite 20 shown in FIG. 8) having a configuration in which layered cementite and layered ferrite overlap each other. "Pearlite" according to the embodiment represents "typical pearlite". The amount of pearlite in the soft portion 11 of the steel wire is not necessarily specified, but is typically the same as the amount of pearlite in the center portion 12 of the steel wire.

A method of measuring the amount of pearlite in the center portion 12 of the steel wire 10 is not particularly limited. For example, the amount of pearlite may be obtained using a method including: polishing and etching the C cross-section of the steel wire 10 so as to make the pearlite structure of the C cross-section of the steel wire 10 appear; and taking optical microscope images or electron microscope images of the C cross-section so as to obtain the area of pearlite in the images. It is preferable that the amount of pearlite in the steel wire 10 is obtained, for example, using a method including: setting portions, where the optical microscope images or the electron microscope images are taken, at the center of the C cross-section of the steel wire 10 and at eight positions in the ¼ depth region of the C cross-section of the steel wire 10 which are arranged at an angle interval of 45° with respect to the center of the steel wire 10; obtaining the amounts of pearlite at these image-taking positions; and obtaining the average value of the amounts of pearlite at the positions.

(Average Lamellar Spacing of Pearlite in Region from Surface of Steel Wire to Depth of 5 μm: Less than that of Pearlite at Center of Steel Wire, and Difference Between Average Lamellar Spacings is 3 nm to 60 nm)

The average lamellar spacing of pearlite in a region from a surface of the steel wire 10 according to the embodiment to a depth of 5 μm is less than that of pearlite at the center of the steel wire 10. The difference between the average lamellar spacing of pearlite in the region from the surface of the steel wire 10 to a depth of 5 μm and the average lamellar spacing of pearlite at the center of the steel wire 10 (hereinafter, abbreviated as "difference in average lamellar spacing") is 3 nm to 60 nm. The region from the surface of the steel wire 10 to a depth of 5 μm is contained in the soft portion 11. Accordingly, in the steel wire 10 according to the embodiment, the average lamellar spacing of the soft portion 11 is less than that of the center.

As the average lamellar spacing decreases, cementite in pearlite is refined, which increases ductility. On the other hand, dislocations are introduced into the steel wire 10 through a heat treatment for reducing the average lamellar spacing, and these dislocations reduce the ductility of the steel wire 10. In general, in a case where the average lamellar spacing of pearlite in the steel wire 10 is small, an effect of the dislocation introduction exceeds an effect of the cementite refinement. Therefore, the ductility of the steel wire 10 is reduced. However, in the soft portion 11 of the steel wire 10 according to the embodiment, most of the dislocations are removed by surface layer heating described below. Accordingly, in a case where the average lamellar spacing of pearlite in the steel wire 10 according to the embodiment is reduced, since the effect of the dislocation introduction is suppressed, the effect of improving the ductility due to the cementite refinement can be obtained. In a case where the difference in average lamellar spacing is less than 3 nm, cementite in pearlite in the region from the surface of the steel wire 10 to a depth of 5 μm is sufficiently refined. Therefore, the ductility of the surface layer part of the steel wire 10 decreases, and workability decreases. The lower limit value of the difference in average lamellar spacing is preferably 5 nm, is more preferably 8 nm, and is even more preferably 10 nm.

On the other hand, in a case where the difference in average lamellar spacing is excessively large, the deformation of the steel wire 10 is inhomogeneous, and delamination is likely to occur. The present inventors found that, in a case where the difference in average lamellar spacing of the steel wire 10 is more than 60 nm, delamination is likely to occur with high frequency. Accordingly, in the steel wire 10 according to the embodiment, it is necessary that the difference in average lamellar spacing is 60 nm or less. The upper limit value of the difference in average lamellar spacing is preferably 40 nm, is more preferably 30 nm, and is even more preferably 25 nm.

Figure 6:
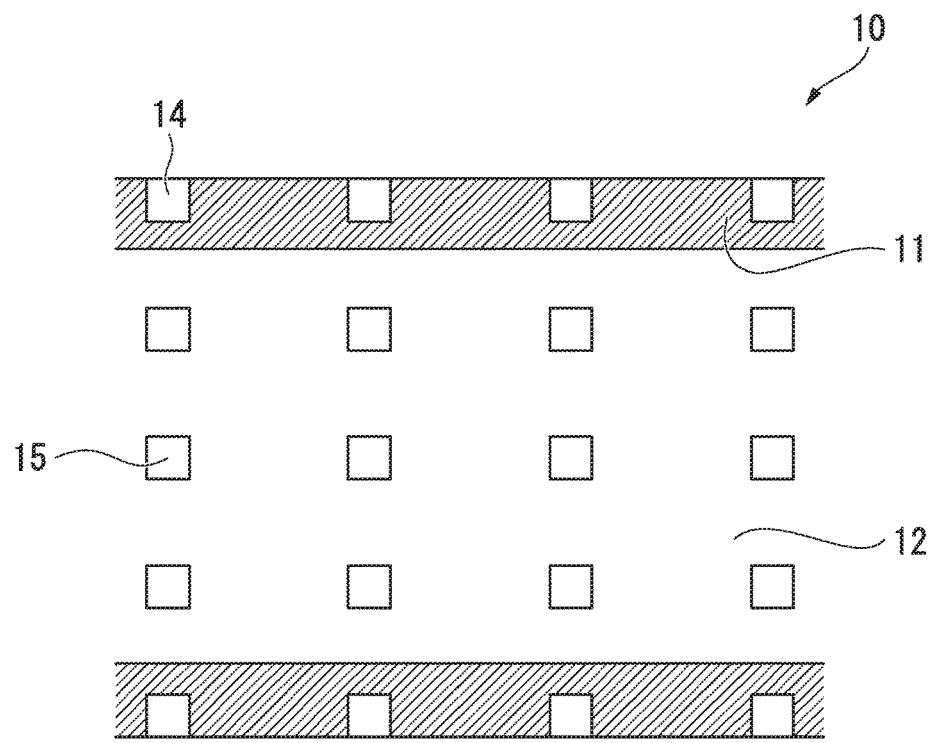
FIG. 6 is a diagram showing an example of a method for measuring a difference in average lamellar spacing of the steel wire according to the embodiment.
Figure 8:
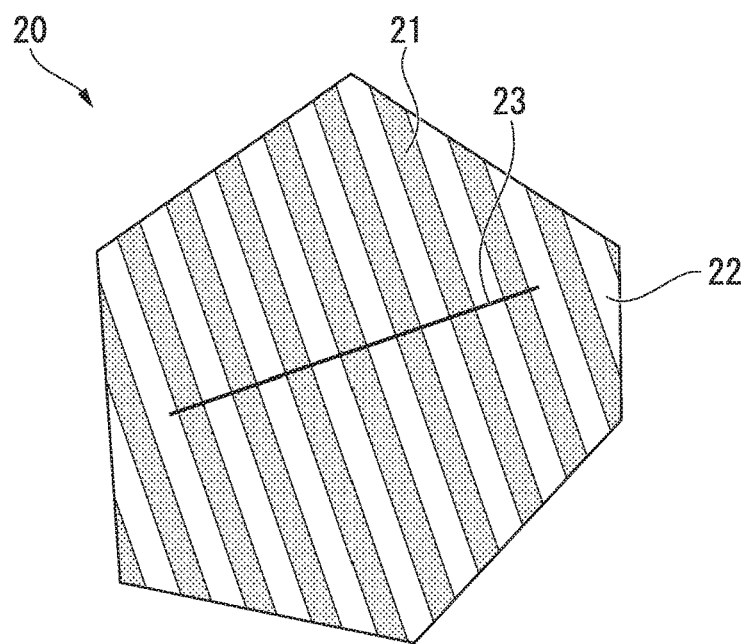
FIG. 8 is a diagram showing the example of the method for measuring the average lamellar spacing of the steel wire according to the embodiment.
Figure 9:
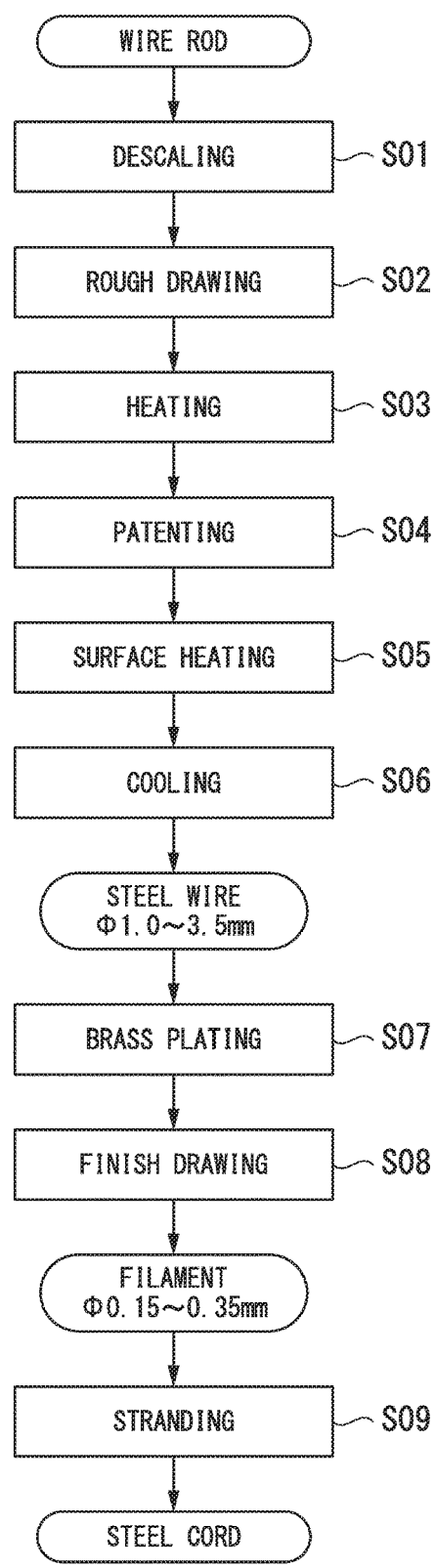
FIG. 9 is a flowchart showing a method for manufacturing the steel wire according to the embodiment.

The average lamellar spacing of pearlite in the region from the surface of the steel wire 10 to a depth of 5 μm may be obtained through steps described below. First, a cross-section (L cross-section) of the steel wire 10, which is parallel to the drawing direction and passes through a center axis of the steel wire 10, is created. This L cross-section is etched using picral so as to make a pearlite structure appear on the L cross-section. Next, in this L cross-section, an electron microscope image of the region from the surface of the steel wire 10 to a depth of 5 μm is taken. A surface layer average lamellar spacing measurement region 14 shown in FIG. 6 is cut from the image. The surface layer average lamellar spacing measurement region 14 is a square having a size of 5 μm×5 μm, and one side of the square matches with the surface of the steel wire 10. The image may be set as the surface layer average lamellar spacing measurement region 14 by setting the electron microscope image as a square having a size of 5 μm×5 μm and making one side of the image to match with the surface of the steel wire 10. Next, as shown in FIG. 8, a pearlite having the smallest lamellar spacing (pearlite 20 in FIG. 8) is selected from a plurality of pearlites contained in the surface layer average lamellar spacing measurement region 14. A line segment 23 having a length of 2 μm which is perpendicular to ferrite layers 21 and cementite layers 22 contained in the pearlite 20 is drawn, the number of cementite layers 22 intersecting the line segment 23 is counted, and the length (2 μm) of the line segment is divided by the number of cementite layers 22. As a result, a lamellar spacing of the surface layer average lamellar spacing measurement region 14 is obtained. Lamellar spacings of eight surface layer average lamellar spacing measurement regions 14 are obtained, and the average thereof is obtained. As a result, the average lamellar spacing of pearlite in the region from the surface of the steel wire 10 to a depth of 5 μm is obtained.

The average lamellar spacing of the center of the steel wire 10 may be obtained through steps described below. Using the same method as the above-described method of measuring the average lamellar spacing of the surface layer part of the steel wire 10, a L cross-section of the steel wire 10 is prepared, and an electron microscope image of a region including the center axis of the steel wire 10 and an electron microscope image including the portion of the steel wire at a depth of ¼ of the wire diameter R are taken. Next, lamellar spacings of twelve center average lamellar spacing measurement regions 15, which are squares having a size of 5 μm×5 μm, are obtained. In four regions of the twelve center average lamellar spacing measurement regions 15, one of line segments connecting the middle points of sides opposite to each other matches with the center axis of the steel wire 10. In eight regions of the twelve center average lamellar spacing measurement regions 15, one of line segments connecting the middle points of sides opposite to each other matches with the region from the surface of the steel wire 10 to a depth of ¼ of the wire diameter R. Lamellar spacings relating to the twelve center average lamellar spacing measurement regions 15 are obtained, and the average thereof is obtained. The obtained average value can be considered as the average lamellar spacing of the center of the steel wire 10.

Figure 7:
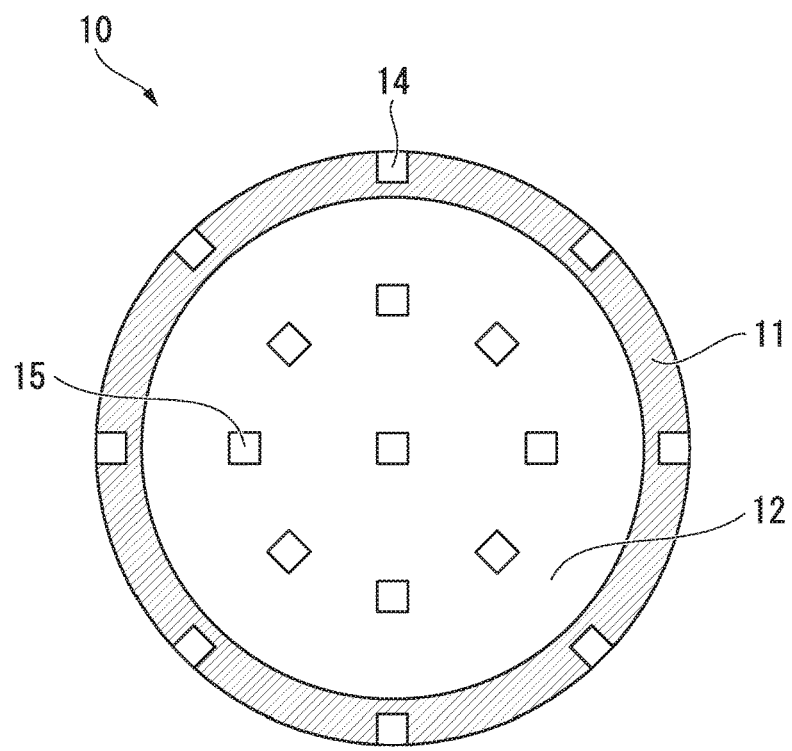
FIG. 7 is a diagram showing an example of a method for measuring a difference in average lamellar spacing of the steel wire according to the embodiment.

The average lamellar spacing may be measured in the cross-section (C cross-section) of the steel wire 10 perpendicular to the drawing direction. In a case where the measurement is performed in the C cross-section as shown in FIG. 7, a method of obtaining the average lamellar spacing of pearlite in the region from the surface of the steel wire 10 to a depth of 5 μm is the same as the measurement method in the L cross-section. In a case where the measurement is performed in the C cross-section, the center average lamellar spacing measurement regions 15 for obtaining the average lamellar spacing of the center of the steel wire 10 can be arranged at positions in the center axis of the steel wire 10 and positions in the portion of the steel wire 10 at a depth of ¼ of the wire diameter R. The lamellar spacing in the embodiment refers to the average value of the distances between the center lines of adjacent cementite layers 22 with a ferrite layer 21 interposed therebetween.

Next, the reason for limiting the chemical composition of the steel wire 10 according to the embodiment as described above will be described.

(C: 0.70% to 1.20%)

C is an element for improving the strength of the steel wire 10. In order to obtain a pearlite structure as an eutectoid structure, the C content is preferably about 0.80%. In a case where the C content is less than 0.70%, the steel wire 10 becomes hypo-eutectoid steel in which a large amount of a non-pearlite structure is present. On the other hand, in a case where the C content is more than 1.20%, pro-eutectoid cementite precipitates, which may decrease the workability of the steel wire 10. Therefore, the C content is set in a range of 0.70% to 1.20%.

(Si: 0.15% to 0.60%)

Si is an element which is effective for the deoxidation of the steel wire 10 and has an effect of improving the strength of the steel wire 10 when being solid-soluted in ferrite. Here, in a case where the Si content is less than 0.15%, the above-described effect may not be sufficiently obtained. On the other hand, in a case where the Si content is more than 0.60%, the workability of the steel wire 10 may decrease. Therefore, the Si content is set in a range of 0.15% to 0.60%. The lower limit value of the Si content is preferably 0.20%, and the upper limit value of the Si content is preferably 0.50%.

(Mn: 0.10% to 1.00%)

Mn is effective for the deoxidation of the steel wire 10 and has an effect of suppressing the embrittlement of steel by fixing S in the steel wire 10. Here, in a case where the Mn content is less than 0.10%, the above-described effect may not be sufficiently obtained. On the other hand, in a case where the Mn content is more than 1.00%, the workability of the steel wire 10 may decrease. Therefore, the Mn content is set to be in a range of 0.10% to 1.00%.

(N: 0.0010% to 0.0050%)

N is an element which forms a nitride by being bonded to Al and/or Ti. This nitride has an effect of suppressing the coarsening of austenite contained in an intermediate steel wire before the start of a patenting S04 described below. By suppressing the coarsening of austenite, the difference in average lamellar spacing of the steel wire 10 can be suppressed to be 60 nm or less as described below. Further, by suppressing the coarsening of austenite, pearlite of the steel wire 10 is refined, and thus the ductility of the steel wire 10 can be improved. In a case where the N content is less than 0.0010%, the above-described effect may not be sufficiently obtained. On the other hand, in a case where the N content is more than 0.0050%, the ductility of the steel wire 10 may decrease. Therefore, the N content is set in a range of 0.0010% to 0.0050%. The lower limit value of the N content is preferably 0.0015%, and the upper limit value of the N content is preferably 0.0045%.

P and S may be contained in the steel wire 10 as impurities. It is not necessary that the P content and the S content are particularly defined. In order to impart ductility to the steel wire 10 at the same level as that of a steel wire of the related art, each of the P content and the S content is preferably 0% to 0.02% and is more preferably 0% to 0.01%. S and P having the above-described contents are considered as impurities.

In addition to the base elements and the impurity elements described above, the steel wire 10 according to the embodiment may further contain at least one selected from the group consisting of Al, Ti, Cr, Co, V, Cu, Nb, Mo, W, B, REM, Ca, Mg, and Zr as an selective element. Hereinafter, the limiting of the contents of the selective elements, and the reason for the limiting will be described. "%" described herein represents "mass %".

(Al: 0% to 0.010%)

Al forms an alumina-based inclusion which is hard and is not likely to be deformed, and this inclusion may cause deterioration in the ductility and drawability of the steel wire 10. Accordingly, it is preferable that the upper limit value of the Al content is set as 0.010%. In addition, the upper limit value of the Al content may be 0.008%. Since Al may not be contained in the steel wire 10 according to the embodiment, the lower limit value of the Al content is 0%. However, Al has an action of forming a nitride by being bonded to N, and, as described above, this nitride has an effect of limiting the difference in average lamellar spacing to be 60 nm or less and an effect of improving the ductility of the steel wire 10 by refining pearlite. In order to obtain these effects, the lower limit value of the Al content may be set as 0.003%.

(Ti: 0% to 0.100%)

Since Ti may not be contained in the steel wire 10 according to the embodiment, the lower limit value of the Ti content is 0%. However, Ti is an element having a deoxidation effect. Ti has an action of forming a nitride by being bonded to N, and, as described above, this nitride has an effect of suppressing the difference in average lamellar spacing to be 60 nm or less and an effect of improving the ductility of the steel wire 10 by refining pearlite. In order to obtain these effects, 0.005% or more of Ti may be contained. On the other hand, in a case where the Ti content is more than 0.100%, a coarse carbon nitride (for example, TiCn) is formed, which may decrease the workability. Accordingly, it is preferable that the upper limit value of the Ti content is set as 0.100%.

(Cr: 0% to 0.50%)

Since Cr may not be contained in the steel wire 10 according to the embodiment, the lower limit value of the Cr content is 0%. However, Cr has an effect of improving the tensile strength of the steel wire 10 by reducing the average lamellar spacing of pearlite. In order to obtain this effect, the Cr content is preferably more than 0% and is more preferably 0.0010% or more. On the other hand, in a case where the Cr content is more than 0.50%, pearlite transformation is suppressed. As a result, austenite may remain in a metallographic structure of an intermediate steel wire during a patenting treatment. Residual austenite becomes a supercooled structure such as martensite, bainite, and the like after the patenting treatment, which deteriorates the characteristics of the steel wire 10. In addition, when the Cr content is more than 0.50%, it may be difficult to remove a surface oxide through mechanical descaling. Accordingly, the Cr content is preferably 0.50% or less.

(Co: 0% to 0.50%)

Since Co may not be contained in the steel wire 10 according to the embodiment, the lower limit value of the Co content is 0%. However, Co is an element having an effect of improving the characteristics of the steel wire 10 by suppressing the precipitation of pro-eutectoid cementite. In order to obtain this effect, the Co content is preferably more than 0% and more preferably 0.0010% or more. On the other hand, in a case where the Co content is more than 0.50%, the above-described effect is saturated, and the production costs may be excessive. Accordingly, the Co content is preferably 0.50% or less and is more preferably 0.40% or less.

(V: 0% to 0.50%)

Since V may not be contained in the steel wire 10 according to the embodiment, the lower limit value of the V content is 0%. However, V has an action of forming a fine carbon nitride by being bonded to N. As described above, this nitride has an effect of suppressing the difference in average lamellar spacing to be 60 nm or less and an effect of improving the ductility of the steel wire 10 by refining pearlite. In order to obtain these effects, the V content is preferably more than 0% and is more preferably 0.0010% or more. On the other hand, in a case where the V content is more than 0.50%, the amount of a carbon nitride formed may be excessive. Further, the particle size of the carbon nitride may increase. This carbon nitride may decrease the ductility of the steel wire. Accordingly, the V content is preferably 0.50% or less and is more preferably 0.40% or less.

(Cu: 0% to 0.20%)

Since Cu may not be contained in the steel wire 10 according to the embodiment, the lower limit value of the Cu content is 0%. However, Cu is an element of improving the corrosion resistance of the steel wire 10. In order to obtain this effect, the Cu content is preferably more than 0% and is more preferably 0.0001% or more. On the other hand, in a case where the Cu content is more than 0.20%, CuS segregates in a grain boundary due to a reaction of Cu and S, and CuS may cause a defect to occur in the steel wire 10. Accordingly, the Cu content is preferably 0.20% or less and is more preferably 0.10% or less.

(Nb: 0% to 0.100%)

Since Nb may not be contained in the steel wire 10 according to the embodiment, the lower limit value of the Nb content is 0%. However, Nb is an element of improving the corrosion resistance of the steel wire 10. In addition, Nb has an action of forming a carbide and/or a nitride. As described above, this carbide and/or nitride has an effect of suppressing the difference in average lamellar spacing to be 60 nm or less and an effect of improving the ductility of the steel wire 10 by refining pearlite. In order to obtain these effects, the Nb content is preferably more than 0% and is more preferably 0.0005% or more. On the other hand, in a case where the Nb content is more than 0.100%, pearlite transformation is suppressed during a patenting treatment. As a result, austenite may remain. Residual austenite becomes a supercooled structure such as martensite, bainite, and the like after the patenting treatment, which deteriorates the characteristics of the steel wire 10. Accordingly, the Nb content is preferably 0.100% or less and is more preferably 0.050% or less.

(Mo: 0% to 0.20%)

Since Mo may not be contained in the steel wire 10 according to the embodiment, the lower limit value of the Mo content is 0%. However, Mo is an element which is enriched in a pearlite growth interface and suppresses the growth of pearlite due to a so-called solute drag effect. As a result, pearlite is refined, and the strength of the steel wire 10 can be improved. In addition, Mo is an element which reduces the amount of a non-pearlite structure having an adverse effect on the characteristics of the steel wire 10 by suppressing the production of ferrite. In order to obtain these effects, the Mo content is preferably more than 0% and is more preferably 0.0010% or more, and is more preferably 0.005% or more. On the other hand, in a case where the Mo content is more than 0.20%, the growth of pearlite is excessively suppressed, a long period of time is required for a patenting treatment, which may cause a decrease in the productivity of the steel wire 10. In addition, in a case where the Mo content is more than 0.20%, a coarse Mo carbide precipitates, and the drawability of the steel wire 10 may decrease. Accordingly, the Mo content is preferably 0.20% or less and is more preferably 0.06% or less.

(W: 0% to 0.200%)

Since W may not be contained in the steel wire 10 according to the embodiment, the lower limit value of the W content is 0%. However, as in the case of Mo, W is an element which is enriched in a pearlite growth interface and suppresses the growth of pearlite due to a so-called solute drag effect. As a result, pearlite is refined, and the strength of the steel wire 10 can be improved. In addition, W is an element which reduces the amount of a non-pearlite structure having an adverse effect on the characteristics of the steel wire 10 by suppressing the production of ferrite. In order to obtain these effects, the W content is preferably more than 0% and more preferably 0.0005% or more. On the other hand, in a case where the W content is more than 0.200%, the growth of pearlite is excessively suppressed, a long period of time is required for a patenting treatment, which may cause a decrease in the productivity of the steel wire 10. In addition, in a case where the W content is more than 0.200%, a coarse W carbide precipitates, and the drawability of the steel wire 10 may decrease. Accordingly, the W content is preferably 0.200% or less and is more preferably 0.060% or less.

(B: 0% to 0.0030%)

Since B may not be contained in the steel wire 10 according to the embodiment, the lower limit value of the B content is 0%. However, B is an element which suppresses the production of a non-pearlite structure such as ferrite, degenerate pearlite, bainite, and the like. In addition, B has an action of forming a carbide and/or a nitride. As described above, this carbide and/or nitride has an effect of limiting the difference in average lamellar spacing to be 60 nm or less and an effect of improving the ductility of the steel wire 10 by refining pearlite. In order to obtain these effects, the B content is preferably more than 0%, is more preferably 0.0004% or more, and is even more preferably 0.0006% or more. On the other hand, in a case where the B content is more than 0.0030%, the precipitation of a coarse $Fe_{23}(CB)_6$ is promoted, which may have an adverse effect on the ductility of the steel wire 10. Accordingly, the B content is preferably 0.0030% or less, is more preferably 0.0025% or less, is still more preferably 0.0015% or less, and is even more preferably 0.0012%.

(REM: 0% to 0.0050%)

Since rare earth metal (REM) may not be contained in the steel wire 10 according to the embodiment, the lower limit value of the REM content is 0%. However, REM is a deoxidizing element. In addition, REM is an element which detoxifies S as an impurity by forming a sulfide. In order to obtain this effect, the REM content is preferably more than 0% and is more preferably 0.0005% or more. On the other hand, in a case where the REM content is more than 0.0050%, a coarse oxide is formed, which may cause wire breaking during the drawing of the steel wire 10. Accordingly, the REM content is preferably 0.0050% or less and is more preferably 0.0020% or less.

REM is a collective term for 17 elements in total including not only 15 elements, which range from lanthanum with an atomic number of 57 and lutetium with an atomic number of 71, but also scandium with an atomic number of 21 and yttrium with an atomic number of 39. Typically, REM is supplied in the form of mischmetal which is a mixture of the elements and is added to steel. The REM content refers to the total amount of the above-described elements.

(Ca: 0% to 0.0050%)

Since Ca may not be contained in the steel wire 10 according to the embodiment, the lower limit value of the Ca content is 0%. However, Ca is an element which reduces the amount of a hard alumina-based inclusion deteriorating the characteristics of the steel wire 10. In addition, Ca is an element which produces a fine oxide. This fine oxide reduces a pearlite block size of the steel wire 10. As a result, the ductility of the steel wire 10 is improved. In order to obtain these effects, it is preferable that the Ca content is more than 0.0005%. On the other hand, in a case where the Ca content is more than 0.0050%, a coarse oxide is formed, which may cause wire breaking during the drawing of the steel wire 10. Accordingly, the Ca content is preferably 0.0050% or less and is more preferably 0.0040% or less. Under typical operating conditions, about 0.0003% of Ca may be contained.

(Mg: 0% to 0.0050%)

Since Mg may not be contained in the steel wire 10 according to the embodiment, the lower limit value of the Mg content is 0%. However, Mg is an element which produces a fine oxide. This fine oxide reduces a pearlite block size of the steel wire 10. As a result, the ductility of the steel wire 10 is improved. In order to obtain this effect, it is preferable that the Mg content be more than 0.0005%. However, in a case where the Mg content is more than 0.0050%, a coarse oxide is formed, which may cause wire breaking during the drawing of the steel wire 10. Accordingly, the Mg content is preferably 0.0050% or less and is more preferably 0.0040% or less. Under typical operating conditions, about 0.0001% of Mg may be contained.

(Zr: 0% to 0.0100%)

Since Zr may not be contained in the steel wire 10 according to the embodiment, the lower limit value of the Zr content is 0%. However, Zr functions as crystallization nuclei of austenite when being crystallized as ZrO. Therefore, Zr is an element which improves the equiaxed grain ratio of austenite and refines austenite grains. In a case where the steel wire 10 according to the embodiment contains Zr, austenite before a patenting treatment is refined, and thus the pearlite block size of the steel wire 10 is reduced. As a result, the ductility of the steel wire 10 is improved. In order to obtain this effect, it is preferable that the Zr content is more than 0.0005%. On the other hand, in a case where the Zr content is more than 0.0100%, a coarse oxide is formed, which may cause wire breaking during the drawing of the steel wire 10. Accordingly, the Zr content is preferably 0.0100% or less and is more preferably 0.0050% or less.

(Remainder Including Fe and Impurities)

The remainder of the chemical composition of the steel wire 10 according to the embodiment includes Fe and impurities. Here, the impurities refer to elements which are, when steel is industrially manufactured, incorporated from raw materials such as ore or scrap or incorporated by various factors of the manufacturing process, and the impurities are allowed to be included in the steel in a range not adversely affecting the characteristics of the steel wire 10 according to the embodiment.

(Tensile Strength: 1100 MPa or Higher)

The tensile strength of the steel wire 10 according to the embodiment is 1100 MPa or higher. A steel cord which is obtained using the steel wire 10 having a tensile strength of 1100 MPa or higher is suitable as a reinforcing material of a rubber product such as an automobile tire, a high-pressure rubber hose, a conveyor belt, and the like.

Next, a method for manufacturing the steel wire 10 according to the embodiment and a method for manufacturing a filament and a steel cord using the steel wire 10 will be described using FIGS. 9 to 13. The method for manufacturing the steel wire 10 according to the embodiment includes: descaling a wire rod to remove oxidized scales on a surface of the wire rod (descaling S01); rough-drawing the descaled wire rod to obtain an intermediate steel wire (rough drawing S02); heating the rough-drawn intermediate steel wire (heating S03); performing a patenting treatment on the heated intermediate steel wire (patenting S04); surface layer heating the patented intermediate steel wire (surface layer heating S05); and cooling the surface-layer-heated intermediate steel wire (cooling S06). As described below, the intermediate steel wire refers to the steel wire 10 which is in the process of manufacturing. Surface layer heating refers to heating only the surface layer of the steel wire. The method for manufacturing a filament using the steel wire 10 according to the embodiment includes; brass plating the steel wire 10 according to the embodiment (brass plating S07); and finish-drawing the brass-plated steel wire 10 (finish drawing S08). The method for manufacturing a high-strength steel cord using the steel wire 10 according to the embodiment includes stranding filaments which are manufactured using the steel wire 10 according to the embodiment (stranding S09).

(Descaling S01)

In the method for manufacturing the steel wire 10 according to the embodiment, a wire rod having the above-described chemical composition is used as a raw material. The kind of the wire rod is not particularly limited but is preferably a hot-rolled wire rod. The diameter of the wire rod is not particularly limited but is preferably about 5.5 mm. The oxidized scales formed on the surface of the wire rod are removed through a chemical treatment such as pickling, or a mechanical treatment. Such a treatment is called descaling. The method for descaling is not particularly limited.

(Rough Drawing S02)

Next, the wire rod from which the oxidized scales are removed is rough-drawn. As a result, an intermediate steel wire having a wire diameter of 1.0 mm to 3.5 mm is formed (rough drawing S02). A method for rough drawing is not particularly limited, but rough drawing is preferably performed through dry drawing. Hereinafter, in order to distinguish a steel wire which is finally obtained and a steel wire which is in the process of manufacturing, the steel wire which is finally obtained (that is the steel wire 10 according to the embodiment) may be called a final steel wire, and the steel wire which is in the process of manufacturing may be called an intermediate steel wire.

(Heating S03)

Next, both a center portion and a soft portion of the intermediate steel wire which is obtained in the rough drawing S02 are heated to a temperature range of 850° C. to 1350° C. (heating S03). In the heating S03, a metallographic structure of the intermediate steel wire is transformed into austenite, and this austenite is transformed into pearlite in the patenting S04 described below. Accordingly, the state of austenite which is produced in the intermediate steel wire in the heating S03 affects the state of pearlite contained in the final steel wire which is obtained after the patenting S04.

In a case where the heating temperature in the heating S03 is lower than 850° C., cementite remains in the intermediate steel wire without solid solution, and ferrite is produced in the intermediate steel wire. In this case, a sufficient amount of austenite cannot be obtained. Therefore, in the next patenting S04, a sufficient amount of pearlite cannot be produced in the intermediate steel wire, and the amount of pearlite in the metallographic structure of the center portion of the final steel wire is lower than 95%. On the other hand, in a case where the heating temperature in the heating S03 is higher than 1350° C., the grain size of austenite increases, and hardenability is improved. Therefore, the difference in average lamellar spacing of the final steel wire may be more than 60 nm.

Figure 10:
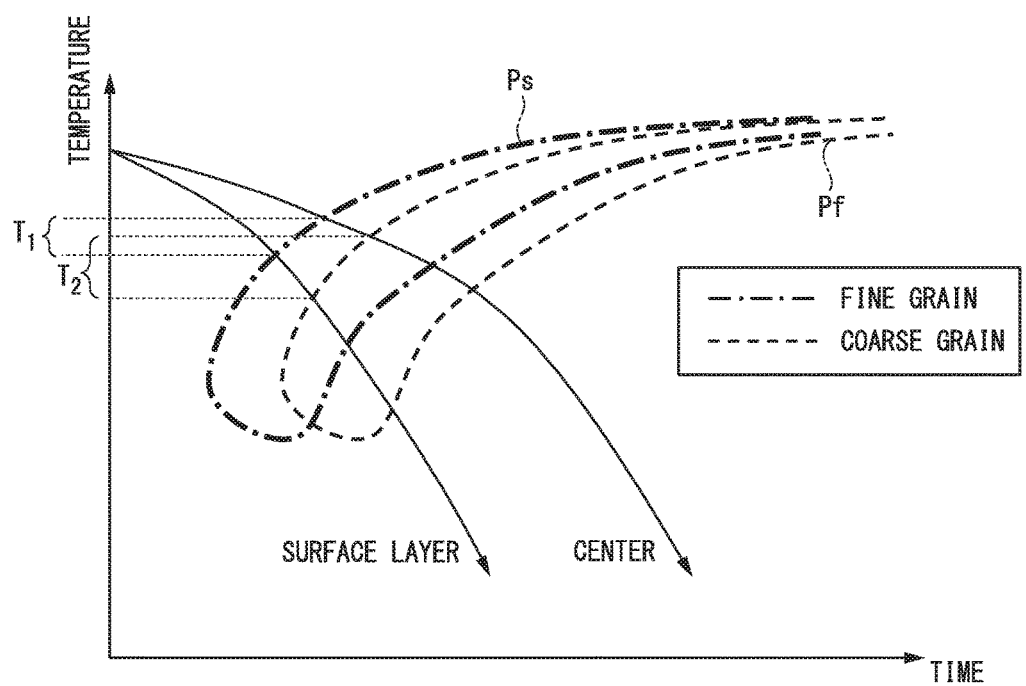
FIG. 10 is a schematic CCT diagram of the steel wire according to the embodiment.
Figure 11:
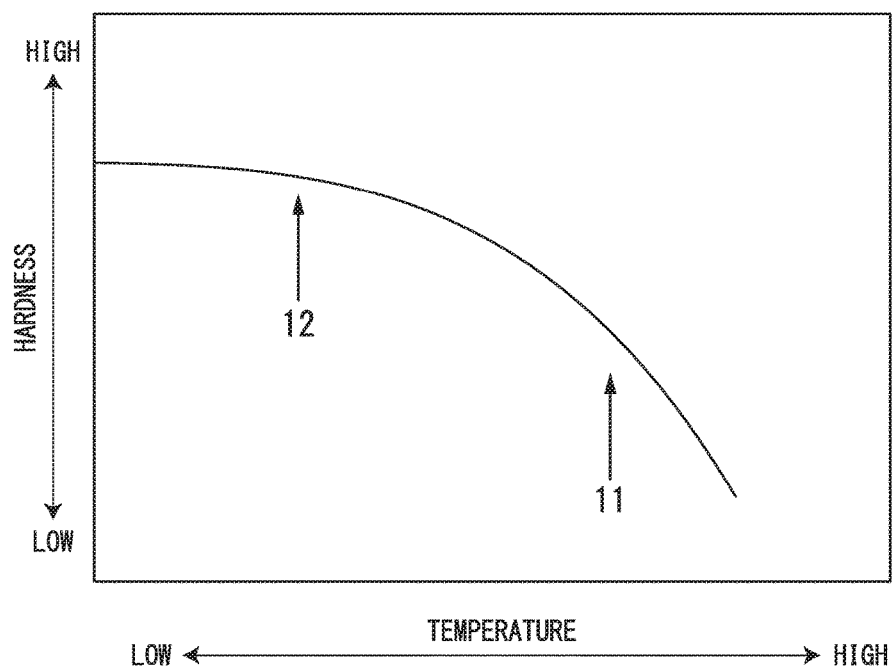
FIG. 11 is a conceptual diagram showing a relationship between a heat treatment temperature and a hardness of pearlite steel.

The reason why the difference in average lamellar spacing increases due to the coarsening of austenite will be described below using FIG. 10. FIG. 10 is a schematic continuous-cooling-transformation (CCT) diagram of the steel wire according to the embodiment. Two curves ranging from Ps to Pf are transformation curves indicating the start and the end of the pearlite transformation. Among the two transformation curve, the transformation curve on the left side is a transformation curve of an intermediate steel wire having a small austenite grain size, and the transformation curve on the right side is a transformation curve of an intermediate steel wire having a large austenite grain size. As the austenite grain size increases, the period of time from the start of patenting to the pearlite transformation is long. Therefore, the transformation curve of the intermediate steel wire having a large austenite grain size is positioned on the right side. In the CCT diagram, two curves extending from the upper left to the lower right are curves indicating the cooling state of the intermediate steel wire in the patenting S04 which is performed after the heating S03. Among the two curves, the curve on the left side indicates the cooling state of the surface layer of the intermediate steel wire, and the curve on the right side indicates the cooling state of the center of the intermediate steel wire. It is more difficult to cool the center of the intermediate steel wire than the surface layer of the intermediate steel wire. Therefore, the curve of the center of the intermediate steel wire is positioned on the right side. $T_1$ shown in FIG. 10 indicates a difference between a temperature, at which the transformation curve of the intermediate steel wire having a small austenite grain size initially intersects with the curve indicating the cooling state of the surface layer of the intermediate steel wire, and a temperature at which the transformation curve of the intermediate steel wire having a small austenite grain size initially intersects with the curve indicating the cooling state of the center of the intermediate steel wire. That is, $T_1$ indicates a difference in pearlite transformation start temperature between the surface layer and the center of the intermediate steel wire having a small austenite grain size. $T_2$ shown in FIG. 10 indicates a difference between a temperature, at which the transformation curve of the intermediate steel wire having a large austenite grain size initially intersects with the curve indicating the cooling state of the surface of the intermediate steel wire, and a temperature at which the transformation curve of the intermediate steel wire having a large austenite grain size initially intersects with the curve indicating the cooling state of the center of the intermediate steel wire. That is, $T_2$ indicates a difference in pearlite transformation start temperature between the surface layer and the center of the intermediate steel wire having a large austenite grain size.

When the pearlite transformation start temperature is low, the lamellar spacing of pearlite decreases. Accordingly, in a case where the difference between the pearlite transformation start temperature of the surface layer and the pearlite transformation start temperature of the center in the intermediate steel wire is large, the difference between the average lamellar spacing of the surface layer and the average lamellar spacing of the center in the intermediate steel wire increases. As shown in FIG. 10, $T_2$ is larger than $T_1$. Accordingly, in a case where austenite of the intermediate steel wire, which is heated in the heating S03, is coarsened, the difference in average lamellar spacing between the surface layer and the center of the intermediate steel wire increases in the next patenting S04, and the difference in average lamellar spacing between the surface and the center of the final steel wire also increases. As a result of investigation in which an experiment was performed multiple times, the present inventors found that, in a case where the heating temperature is higher than 1350° C., the difference in average lamellar spacing of the final steel wire is highly likely to be 60 nm or more due to an increase in the austenite grain size of the intermediate steel wire. Due to the above-described reason, it is necessary that the heating temperature in the heating S03 is 850° C. to 1350° C.

(Patenting S04)

Next, a patenting treatment of dipping the intermediate steel wire heated in the heating S03 in a molten lead bath (lead bath) after the completion of the heating S03 is performed (patenting S04). The temperature of the lead bath is set to be 530° C. to 580° C., and the dipping time of the intermediate steel wire in the lead bath is set to be 5 seconds to 45 seconds. In addition, a period of time from the end of the heating S03 to the start of the patenting S04 is about 5 seconds. The patenting treatment may be performed using a molten salt instead of the molten lead.

The reason for limiting the temperature of the molten lead in the patenting S04 is as follows. In a case where the temperature of the lead bath is lower than 530° C., a bainite structure is produced in the surface layer of the intermediate steel wire. As a result, the tensile strength of the final steel wire decreases. In addition, in a case where the temperature of the lead bath is higher than 580° C., the tensile strength of the final steel wire decreases. In order to obtain a sufficient tensile strength, it is preferable that the temperature of the lead bath is 530° C. to 580° C.

The reason for limiting the dipping time of the intermediate steel wire in the lead bath in the patenting S04 is as follows. In a case where the dipping time is less than 5 seconds, the pearlite transformation is not completely finished, and the fraction of pearlite of the final steel wire decreases. In addition, in a case where the dipping time is 45 seconds or longer, a part of cementite in the lamellar pearlite is fragmented. As a result, the tensile strength of the final steel wire decreases.

After being extracted from the lead bath in the patenting S04, the intermediate steel wire is cooled to room temperature. At this time, the cooling rate is 10° C./sec or faster. In a case where the cooling rate of the intermediate steel wire is slower than 10° C./sec, the strength of the final steel wire may decrease.

(Surface Layer Heating S05)

Next, by performing high-frequency heating on the intermediate steel wire having undergone the patenting S04 at a frequency of 50 kHz or higher, surface layer heating of heating the surface temperature of the intermediate steel wire to be in a range of 500° C. to 700° C. is performed (surface layer heating S05). At this time, it is necessary that the heating time to be 5 seconds or shorter. In the surface layer heating S05, only the surface layer of the intermediate steel wire is heated. As a result, among dislocations introduced during the pearlite transformation in the patenting S04, most of dislocations in the surface layer of the intermediate steel wire are removed. Therefore, there is a difference in hardness between the vicinity of the center and the surface layer part in the intermediate steel wire, and the soft portion 11 having a thickness of 5 µm or more is formed.

In the surface layer heating S05, it is necessary to sufficiently heat the surface layer of the intermediate steel wire as well as to suppress an increase in the internal temperature of the intermediate steel wire to be as low as possible. In a case where the inside of the intermediate steel wire is excessively heated, the final steel wire which includes the soft portion 11 having a thickness of 5 µm or more cannot be obtained. Due to the high-frequency heating, only the surface layer of the steel wire can be heated. The best heating method for forming a predetermined soft portion 11 is high-frequency heating. In a case where the high-frequency heating is performed, it is necessary that the high frequency applied to the intermediate steel wire is 50 kHz or higher. In a case where the frequency during the high-frequency heating is lower than 50 kHz, the inside of the intermediate steel wire is also heated. Therefore, the final steel wire which includes the soft portion 11 having a thickness of 5 µm or more cannot be obtained. The upper limit value of the high frequency applied to the intermediate steel wire is not particularly limited. However, in consideration of plant capacity, it is preferable that the upper limit value of the high frequency is 100 kHz. The high-frequency heating can be performed by allowing the intermediate steel wire to continuously pass through the inside of a high frequency coil. Therefore, not only the above-described heating rate but also the production efficiency are satisfactory, and thus the high-frequency heating is preferable. In addition, according to the high-frequency heating, uniform heating can be performed. Therefore, the depth of the soft portion 11 obtained by the high-frequency heating is substantially constant.

In the surface layer heating S05, it is necessary that the surface temperature of the intermediate steel wire is 500° C. or higher. In a case where the surface temperature of the intermediate steel wire is lower than 500° C., dislocations in the surface layer of the intermediate steel wire are not sufficiently removed. Therefore, the soft portion 11 having a thickness of 5 µm or more cannot be formed. On the other hand, in a case where the surface temperature of the intermediate steel wire is higher than 700° C. in the surface layer heating S05, cementite in the lamellar pearlite is fragmented and spheriodized. As a result, the tensile strength of the final steel wire decreases.

In addition, in the surface layer heating S05, it is necessary to perform the heating rapidly in order to avoid an increase in the internal temperature of the intermediate steel wire. Accordingly, it is necessary that the heating time in the surface layer heating S05 is set to be within 5 seconds. In a case where the surface layer heating is performed by high-frequency heating, the heating time is a period of time during which the intermediate steel wire passes through a high frequency coil, and can be obtained by divide the length of the high frequency coil by the passage speed of the intermediate steel wire. It is not necessary to limit the temperature at which the surface layer heating starts. However, in order to control the surface temperature of the intermediate steel wire to be 500° C. or higher within 5 seconds, it is preferable that the temperature at which the surface layer heating starts is set to be 10° C. or higher.

Instead of the high-frequency heating, another method capable of performing heating under the same conditions as the above-described high-frequency heating conditions may be applied to the surface layer heating S05. However, a heating method using a heating furnace which is typically used for the heat treatment of the steel wire cannot be performed under the same conditions as the above-described heating conditions, and thus, cannot form the soft portion 11 having a thickness of 5 µm to 0.1×R mm.

(Cooling S06)

Figure 12:
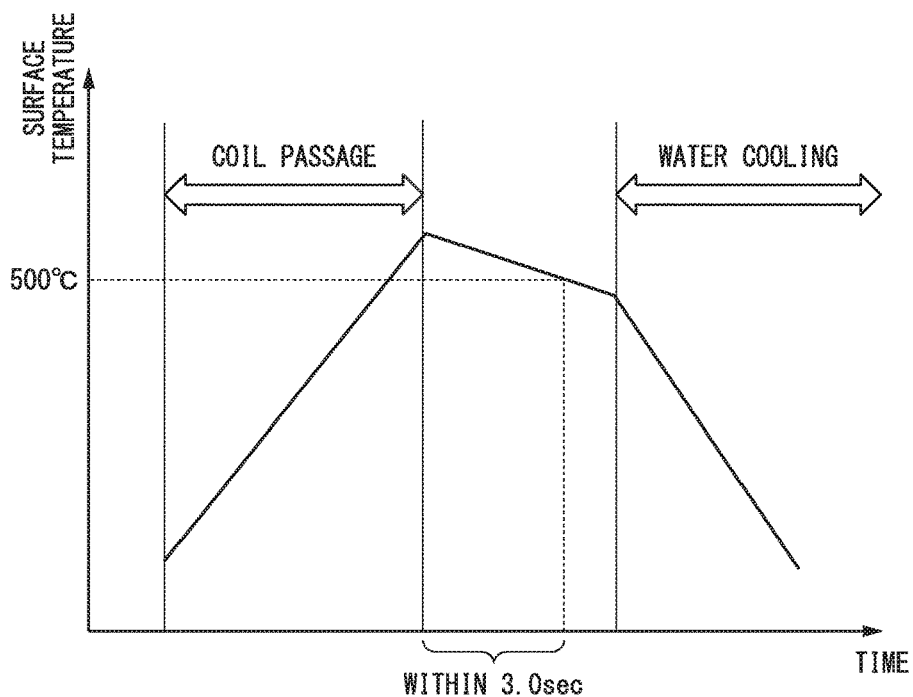
FIG. 12 is a diagram showing a method for cooling the steel wire according to the embodiment after a surface layer heat treatment.

The intermediate steel wire in which only the surface layer is heated in the surface layer heating S05 is cooled in the cooling S06. At this time, as shown in FIG. 12, it is necessary to control the surface temperature of the intermediate steel wire to be 500° C. or lower within 3.0 seconds after the completion of the surface layer heating S05. It is preferable to control the surface temperature of the intermediate steel wire to be 500° C. or lower within 2.0 seconds after the completion of the surface layer heating S05. In a case where the surface layer heating S05 is performed by high-frequency heating, the time of completion of the surface layer heating S05 is the time at which the intermediate steel wire exits from the high-frequency heating coil. In a case where the above-described cooling conditions are not achieved, the inside of the intermediate steel wire is softened, and thus, the soft portion 11 having a thickness of 5 µm to 0.1×R mm cannot be formed.

A cooling method in the cooling S06 is not particularly limited as long as the above-described cooling conditions are achieved. When the surface heating temperature in the surface layer heating S05 is 500° C. or is slightly higher than 500° C., the above-described cooling conditions can be achieved by air cooling. However, due to disturbance factors such as an atmosphere temperature, the surface temperature of the intermediate steel wire at the time of completion of the surface layer heating S05 may be unexpectedly higher than 500° C., and the above-described cooling conditions may not be achieved by air cooling. On the other hand, by water-cooling the intermediate steel wire within 3.0 seconds after the completion of the surface layer heating S05, the above-described cooling conditions can be achieved reliably.

Through the above-described S01 to S06, the steel wire 10 according to the embodiment (final steel wire) is manufactured. After the completion of the cooling S06, it is not preferable to perform an additional heat treatment on the steel wire 10. The reason for this is as follows: in a case where the inside of the steel wire 10 is heated by the additional heat treatment, the hardness of the inside of the steel wire 10 decreases, and thus the soft portion 11 having a thickness of 5 μm to 0.1×R mm may be lost.

Hereinafter, an example of the method for manufacturing a filament or a steel cord using the steel wire 10 according to the embodiment will be described. However, a method of processing the steel wire 10 according to the embodiment is not limited to the following exemplary method.

(Brass Plating S07)

It is preferable that the surface of the steel wire 10 according to the embodiment is brass-plated (brass plating S07). The brass plating is formed to improve adhesion between rubber and the steel cord.

(Finish Drawing S08)

Figure 13:
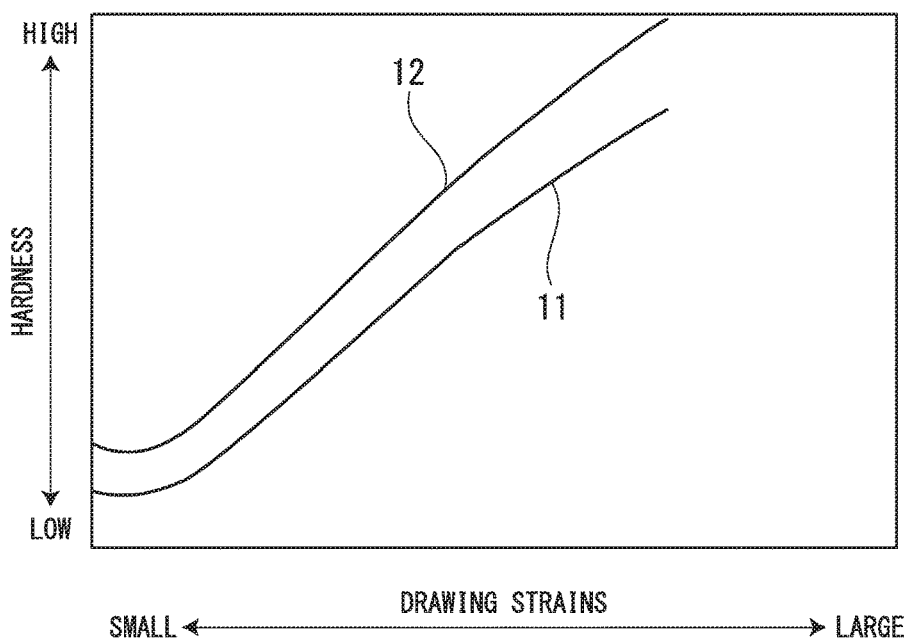
FIG. 13 is a conceptual diagram showing a work hardening curve of the steel wire according to the embodiment.

By performing wet drawing on the steel wire 10 which is brass-plated in the brass plating S07, a filament having a wire diameter of 0.15 mm to 0.35 mm is formed (finish drawing S08). In a case where the steel wire 10 including the center portion 12 and the soft portion 11 is drawn, the difference in hardness between the center portion 12 and the soft portion 11 increases. FIG. 13 is a graph showing a relationship between the amount of drawing strains applied to the steel wire, the hardness of the center portion 12, and the hardness of the soft portion 11. FIG. 13 shows that the difference between the hardness of the center portion 12 and the hardness of the soft portion 11 increases along with an increase in the amount of drawing strains.

(Stranding S09)

Next, a plurality of filaments are stranded (stranding S09). As a result, a high-strength steel cord having a stranded wire structure is manufactured.

Hereinabove, the steel wire 10 according to the embodiment, the method for manufacturing the steel wire 10 according to the embodiment, and the method for manufacturing a steel cord using the steel wire 10 according to the embodiment have been described. The steel wire 10 according to the embodiment having the above-described configuration includes the soft portion 11 and the center portion 12, in which the soft portion 11 has a lower Vickers hardness than the center portion 12, and in which a difference between the Vickers hardness of the soft portion 11 and the Vickers hardness of the portion of the steel wire 10 at a depth of ¼ of the diameter R is Hv 30 or higher. The ductility of the soft portion 11 is improved, and the tensile strength of the center portion 12 is maintained to be high. Accordingly, in the steel wire 10 according to the embodiment, defects such as cracking are suppressed in the finish drawing S08 and the stranding S09. In addition, the steel wire 10 according to the embodiment can be stranded favorably in the stranding S09. Therefore, by using the steel wire 10 according to the embodiment, a high-quality high-strength steel cord in which stranding defects are suppressed can be manufactured. On the other hand, the steel wire 10 according to the embodiment has a high tensile strength.

In addition, the steel wire 10 according to the embodiment includes as a chemical composition, by mass %, C: 0.70% to 1.20%, Si: 0.15% to 0.60%, Mn: 0.10% to 1.00%, N: 0.0010% to 0.0050%, Al: 0% to 0.010%, Ti: 0% to 0.10%, Cr: 0% to 0.50%, Co: 0% to 0.50%, V: 0% to 0.50%, Cu: 0% to 0.20%, Nb: 0% to 0.100%, Mo: 0% to 0.20%, W: 0% to 0.200%, B: 0% to 0.0030%, REM: 0% to 0.0050%, Ca: 0% to 0.0050%, Mg: 0% to 0.0050%, Zr: 0% to 0.0100%, and a remainder including Fe and impurities. A metallographic structure of the center portion 12 of the steel wire 10 according to the embodiment contains 95% to 100% of pearlite by area %. Accordingly, in the center portion 12 of the steel wire 10 according to the embodiment, the tensile strength is sufficiently maintained to be high. The steel cord which is manufactured using the steel wire 10 according to the embodiment can also be made to have a high tensile strength.

In addition, in the steel wire 10 according to the embodiment, the thickness t of the soft portion 11 is within a range of 5 μm≤t≤0.1×R mm. Therefore, in the steel wire 10 according to the embodiment, the workability of the steel wire 10 can be sufficiently secured, defects such as cracking can be suppressed in the finish drawing S08 and the stranding S09, and the strength of the steel wire 10 can be sufficiently secured.

The method for manufacturing the steel wire 10 according to the embodiment includes the surface layer heating S05 of heating the surface temperature of the steel wire to be 500° C. or higher by, for example, performing high-frequency heating on the steel wire having undergone the patenting S04 at a frequency of 50 kHz or higher. Accordingly, in the method for manufacturing the steel wire 10 according to the embodiment, there is a difference in temperature between the inside and the surface layer of the steel wire, and the soft portion 11 and the center portion 12 having different hardnesses and lamellar spacings from each other can be formed.

Hereinabove, the steel wire 10 according to the embodiment has been described, but the present invention is not limited thereto. Within a range not departing from the technical scope of the present invention, various modifications can be made. For example, the thickness of the soft portion is not limited to the embodiment. In addition, the wire diameter of the wire rod, the wire diameter of the filament, and the like can be appropriately modified without being limited to the embodiment.

EXAMPLES

Hereinafter, the results of a confirmatory experiment which was performed to confirm the effects of the present invention will be described.

Steel wire having chemical compositions as shown in Tables 1-1, 1-2, 2-1, and 2-2 were prepared. The amounts of P and S contained in each of the chemical compositions of the steel wires of Examples 1 to 25 and the steel wires of Comparative Examples 26 to 46 were at a level at which P and S were able to be considered to be impurities.

The steel wires of Examples 1 to 25 and the steel wires of Comparative Examples 26 to 36 were manufactured using the method for manufacturing the steel wire according to the embodiment.

A steel wire of Comparative Example 37 was manufactured using a manufacturing method based on the method for manufacturing the steel wire according to the above-described embodiment, except that the surface layer heating S05 was not performed.

A steel wire of Comparative Example 38 was manufactured using a manufacturing method based on the method for manufacturing the steel wire according to the above-described embodiment, except that the heating temperature in the heating S03 was 1380° C. (that is, higher than 1350° C.).

A steel wire of Comparative Example 39 was manufactured using a manufacturing method based on the method for manufacturing the steel wire according to the above-described embodiment, except that the heating temperature in the heating S03 was 830° C. (that is, lower than 850° C.).

A steel wire of Comparative Example 40 was manufactured using a manufacturing method based on the method for manufacturing the steel wire according to the above-described embodiment, except that the dipping time in the lead bath in the patenting S04 was 4 seconds (that is, less than 5 seconds).

A steel wire of Comparative Example 41 was manufactured using a manufacturing method based on the method for manufacturing the steel wire according to the above-described embodiment, except that the dipping time in the lead bath in the patenting S04 was 50 seconds (that is, longer than 45 seconds).

A steel wire of Comparative Example 42 was manufactured using a manufacturing method based on the method for manufacturing the steel wire according to the above-described embodiment, except that the cooling rate after the dipping in the lead bath in the patenting S04 was 8° C./sec (that is, slower than 10° C./sec).

A steel wire of Comparative Example 43 was manufactured using a manufacturing method based on the method for manufacturing the steel wire according to the above-described embodiment, except that the frequency of the high-frequency heating performed in the surface layer heating S05 was 30 kHz (that is, lower than 50 kHz).

A steel wire of Comparative Example 44 was manufactured using a manufacturing method based on the method for manufacturing the steel wire according to the above-described embodiment, except that the surface layer heating temperature in the surface layer heating S05 was 480° C. (that is, lower than 500° C.).

A steel wire of Comparative Example 45 was manufactured using a manufacturing method based on the method for manufacturing the steel wire according to the above-described embodiment, except that the surface layer heating temperature in the surface layer heating S05 was 730° C. (that is, higher than 700° C.).

A steel wire of Comparative Example 46 was manufactured using a manufacturing method based on the method for manufacturing the steel wire according to the above-described embodiment, except that the time required to control the surface layer temperature in the cooling S06 to be 500° C. or lower was 4 seconds (that is, longer than 2 seconds).

Regarding each of the obtained steel wires 1 to 46, the amount of pearlite, the wire diameter R, the thickness of the soft portion, the hardness of the surface layer, the hardness of the center portion, the average lamellar spacing of the surface layer portion, the average lamellar spacing of the center portion, the difference in average lamellar spacing, whether or not delamination occurred, and the tensile strength TS were evaluated.

The amount of pearlite in the center portion of the steel wire was the average value of the amounts of pearlite measured at the center of the C cross-section of the steel wire and at eight positions in the ¼ depth region of the C cross-section of the steel wire which were arranged at an angle interval of 45° with respect to the center of the steel wire. The amount of pearlite at each of the measurement positions was obtained based on an optical microscope image or a SEM image of the C cross-section of the steel wire where the pearlite structure appeared.

The thickness of the soft portion was obtained based on the hardness distribution of the steel wire in the depth direction which was obtained by measuring the hardness of the steel wire. The graph showing the relationship between the depth and the hardness of the steel wire, such as the graph shown in FIG. 2, was obtained by appropriately preparing the C cross-section of the steel wire and performing the continuous hardness measurement in a direction from the outer circumference to the center of the cut surface. From this graph, the thickness of the region having a Vickers hardness, which was lower than that of the steel wire at a depth of ¼ of the wire diameter R by Hv 30 or higher, was obtained. The depth interval in the hardness measurement was 1 μm.

The hardness of the surface layer was the average value of the Vickers hardness values measured at eight positions at a depth of 2 μm from the surface of the steel wire which were arranged at an angle interval of 45° with respect to the center of the steel wire.

The hardness of the center portion was the average value of the Vickers hardness values measured at the center of the steel wire and at eight positions of the steel wire at a depth of ¼ of the wire diameter R from the surface of the steel wire which were arranged at an angle interval of 45° with respect to the center of the steel wire.

The average lamellar spacing of the surface layer part (the lamellar spacing of the surface layer) was obtained through steps described below. First, a pearlite structure was made to appear on a L cross-section of the steel wire. Next, in this L cross-section, an electron microscope image of a region from the surface of the steel wire to a depth of 5 μm was taken. A surface layer average lamellar spacing measurement region shown in FIG. 6 was cut from the image. The surface layer average lamellar spacing measurement region was a square having a size of 5 μm×5 μm, and one side of the square was made to match with the surface of the steel wire. Next, as shown in FIG. 8, a pearlite having the largest lamellar spacing was selected from the plurality of pearlites contained in the surface layer average lamellar spacing measurement region. A line segment having a length of 2 μm which was perpendicular to ferrite layers and cementite layers contained in the pearlite was drawn, the number of cementite layers intersecting the line segment was counted, and the length (2 μm) of the line segment was divided by the number of cementite layers. As a result, a lamellar spacing relating to the surface layer average lamellar spacing measurement region was obtained. Lamellar spacings relating to eight surface layer average lamellar spacing measurement regions were obtained, and the average thereof was obtained. As a result, the average lamellar spacing of pearlite in the region from the surface of the steel wire to a depth of 5 μm was obtained.

The average lamellar spacing of the center (the lamellar spacing of the center) was obtained through steps described below. Using the same method as the above-described method of measuring the average lamellar spacing of the surface layer part, a L cross-section of the steel wire is prepared, and an electron microscope image of a region including the center axis of the steel wire and an electron microscope image of a region including the portion of the steel wire at a depth of ¼ of the wire diameter R were taken. Next, lamellar spacings relating to twelve center average lamellar spacing measurement regions, which were squares having a size of 5 μm×5 μm, were obtained. In four regions of the twelve center average lamellar spacing measurement regions, one of line segments connecting the middle points of sides opposite to each other matched with the center axis of the steel wire. In eight regions of the twelve center average lamellar spacing measurement regions, one of line segments connecting the middle points of sides opposite to each other matched with the region from the surface of the steel wire to a depth of ¼ of the wire diameter R. Lamellar spacings relating to the twelve center average lamellar spacing measurement regions were obtained, and the average thereof was obtained. As a result, the average lamellar spacing of the center of the steel wire was obtained.

Whether or not delamination occurred was determined by performing a torsion test on the steel wire. In a case where the torsion test is performed on a steel wire where delamination occurs, a fracture surface formed by torsional fracture is not a shear fracture surface but a fracture surface following a longitudinal crack. Therefore, whether or not delamination occurs can be determined by inspecting the shape of the fracture of the torsion-fractured steel wire.

The tensile strength TS was obtained in a tensile test according to JIS Z 2241 "Method of Tensile Test for Metallic Materials".

The evaluation results are shown in Tables 1-3 and 2-3.

TABLE 1-1

| | No. | CHEMICAL COMPOSITION (mass %) | | | | | | | | |
|---|---|---|---|---|---|---|---|---|---|---|
| | | C | Si | Mn | Al | N | Ti | Cr | Mo | Cu |
| EXAMPLES | 1 | 0.70 | 0.21 | 0.81 | — | 0.0024 | — | — | — | — |
| | 2 | 0.71 | 0.16 | 0.11 | 0.006 | 0.0025 | — | 0.49 | — | — |
| | 3 | 0.72 | 0.17 | 0.79 | — | 0.0011 | 0.030 | 0.01 | — | — |
| | 4 | 0.72 | 0.16 | 0.99 | — | 0.0028 | 0.096 | 0.05 | 0.19 | — |
| | 5 | 0.72 | 0.31 | 0.12 | — | 0.0026 | 0.006 | — | — | 0.05 |
| | 6 | 0.72 | 0.30 | 0.79 | — | 0.0035 | 0.012 | 0.19 | 0.05 | — |
| | 7 | 0.71 | 0.32 | 0.99 | 0.006 | 0.0048 | — | 0.20 | — | — |
| | 8 | 0.72 | 0.59 | 0.11 | — | 0.0034 | 0.050 | 0.49 | — | 0.12 |
| | 9 | 0.72 | 0.58 | 0.79 | 0.009 | 0.0031 | — | 0.18 | — | — |
| | 10 | 0.72 | 0.59 | 0.98 | 0.001 | 0.0031 | — | — | 0.19 | — |
| | 11 | 0.81 | 0.17 | 0.99 | — | 0.0028 | 0.032 | — | — | — |
| | 12 | 0.80 | 0.31 | 0.12 | — | 0.0026 | 0.006 | 0.19 | — | 0.19 |
| | 13 | 0.79 | 0.58 | 0.79 | — | 0.0035 | 0.012 | 0.20 | 0.05 | — |
| | 14 | 0.89 | 0.59 | 0.12 | 0.001 | 0.0034 | 0.015 | 0.19 | — | — |
| | 15 | 0.88 | 0.34 | 0.98 | 0.003 | 0.0031 | 0.032 | 0.20 | — | — |
| | 16 | 0.89 | 0.17 | 0.78 | — | 0.0031 | — | — | — | 0.05 |
| | 17 | 0.98 | 0.30 | 0.98 | — | 0.0028 | 0.006 | 0.35 | 0.19 | — |
| | 18 | 0.97 | 0.59 | 0.12 | — | 0.0026 | 0.012 | — | — | — |
| | 19 | 0.99 | 0.17 | 0.99 | 0.003 | 0.0035 | — | 0.20 | — | — |
| | 20 | 1.09 | 0.17 | 0.98 | 0.001 | 0.0034 | 0.006 | 0.19 | 0.05 | — |
| | 21 | 1.08 | 0.31 | 0.12 | — | 0.0031 | 0.015 | 0.32 | — | — |
| | 22 | 1.08 | 0.59 | 0.79 | — | 0.0031 | 0.032 | — | — | 0.19 |
| | 23 | 1.18 | 0.16 | 0.12 | 0.003 | 0.0031 | — | 0.19 | — | — |
| | 24 | 1.19 | 0.30 | 0.79 | — | 0.0028 | — | 0.20 | — | — |
| | 25 | 1.19 | 0.59 | 0.98 | 0.002 | 0.0026 | — | — | 0.19 | — |

THE SYMBOL "—" REPRESENTS THAT AN ELEMENT CORRESPONDING TO THE SYMBOL IS NOT CONTAINED (OR IS CONTAINED AS AN IMPURITY).
THE REMAINDER OF THE CHEMICAL COMPOSITION OF EACH STEEL WIRE INCLUDES IRON AND IMPURITIES.

TABLE 1-2

| | No. | CHEMICAL COMPOSITION (mass %) | | | | | | | | |
|---|---|---|---|---|---|---|---|---|---|---|
| | | V | Co | W | Nb | B | Mg | Ca | REM | Zr |
| EXAMPLES | 1 | — | — | — | — | — | — | — | — | — |
| | 2 | — | 0.05 | — | — | — | — | — | — | — |
| | 3 | 0.05 | — | — | — | 0.0025 | — | — | — | — |
| | 4 | — | — | — | — | — | — | — | — | — |
| | 5 | — | — | 0.19 | — | — | — | — | — | — |
| | 6 | — | 0.13 | — | — | 0.0010 | — | — | — | — |
| | 7 | 0.12 | — | — | — | — | — | — | — | — |
| | 8 | — | — | — | — | — | — | — | 0.0029 | — |
| | 9 | — | 0.49 | — | 0.090 | 0.0010 | — | 0.0029 | — | — |
| | 10 | — | — | — | — | — | 0.0029 | — | — | — |
| | 11 | — | — | 0.070 | — | — | — | — | — | 0.0005 |
| | 12 | — | — | — | — | 0.0010 | — | — | — | — |
| | 13 | — | — | — | — | — | — | — | 0.0049 | — |
| | 14 | — | — | — | — | — | — | 0.0049 | — | — |
| | 15 | 0.49 | — | — | — | — | 0.0049 | — | — | — |
| | 16 | — | — | — | — | 0.0007 | — | — | — | 0.0009 |
| | 17 | — | — | — | — | — | — | — | — | — |
| | 18 | — | 0.12 | — | — | — | — | — | — | — |
| | 19 | 0.05 | — | — | — | — | — | — | — | — |
| | 20 | — | — | — | — | 0.0007 | — | — | — | — |
| | 21 | — | — | — | 0.020 | — | — | — | — | — |
| | 22 | — | — | 0.070 | — | — | — | — | — | — |
| | 23 | — | — | — | — | — | — | — | — | — |
| | 24 | 0.07 | — | — | — | — | — | — | — | — |
| | 25 | — | — | — | — | — | — | — | — | — |

THE SYMBOL "—" REPRESENTS THAT AN ELEMENT CORRESPONDING TO THE SYMBOL IS NOT CONTAINED (OR IS CONTAINED AS AN IMPURITY).
THE REMAINDER OF THE CHEMICAL COMPOSITION OF EACH STEEL WIRE INCLUDES IRON AND IMPURITIES.

TABLE 1-3

EVALUATION OF CHARACTERISTICS OF STEEL WIRE AFTER DRAWING

| | No. | PEARLITE (area %) | WIRE DIAMETER R (mm) | THICKNESS OF SOFT PORTION (μm) | HARDNESS OF SURFACE LAYER (Hv) | HARDNESS OF CENTER PORTION (Hv) | LAMELLAR SPACING OF SURFACE LAYER (nm) |
|---|---|---|---|---|---|---|---|
| EXAMPLES | 1 | 98 | 1.00 | 30 | 308 | 342 | 115 |
| | 2 | 97 | 1.00 | 30 | 312 | 345 | 115 |
| | 3 | 98 | 1.30 | 40 | 336 | 370 | 100 |
| | 4 | 99 | 1.40 | 50 | 310 | 356 | 84 |
| | 5 | 96 | 1.60 | 30 | 308 | 358 | 76 |
| | 6 | 98 | 2.50 | 200 | 328 | 363 | 100 |
| | 7 | 99 | 1.70 | 70 | 329 | 363 | 103 |
| | 8 | 98 | 1.60 | 50 | 345 | 392 | 76 |
| | 9 | 97 | 1.80 | 70 | 338 | 373 | 98 |
| | 10 | 98 | 1.50 | 90 | 309 | 346 | 106 |
| | 11 | 99 | 2.90 | 120 | 345 | 383 | 91 |
| | 12 | 96 | 1.20 | 40 | 328 | 373 | 83 |
| | 13 | 99 | 1.10 | 30 | 319 | 382 | 68 |
| | 14 | 98 | 1.50 | 40 | 350 | 434 | 65 |
| | 15 | 99 | 2.00 | 50 | 350 | 433 | 63 |
| | 16 | 98 | 2.70 | 80 | 344 | 445 | 66 |
| | 17 | 99 | 1.90 | 50 | 340 | 440 | 65 |
| | 18 | 99 | 2.20 | 100 | 343 | 446 | 64 |
| | 19 | 98 | 1.40 | 40 | 348 | 446 | 55 |
| | 20 | 97 | 1.30 | 90 | 353 | 454 | 58 |
| | 21 | 98 | 1.60 | 110 | 360 | 459 | 56 |
| | 22 | 97 | 1.60 | 50 | 352 | 474 | 59 |
| | 23 | 99 | 1.10 | 30 | 357 | 477 | 53 |
| | 24 | 98 | 1.60 | 30 | 354 | 487 | 52 |
| | 25 | 97 | 1.40 | 70 | 353 | 495 | 51 |

| | No. | LAMELLAR SPACING OF CENTER PORTION (nm) | DIFFERENCE IN LAMELLAR SPACING (nm) | WHETHER OR NOT DELAMINATION OCCURRED | TENSILE STRENGTH TS (MPa) |
|---|---|---|---|---|---|
| EXAMPLES | 1 | 147 | 32 | NONE | 1145 |
| | 2 | 149 | 34 | NONE | 1150 |
| | 3 | 121 | 20 | NONE | 1234 |
| | 4 | 135 | 52 | NONE | 1187 |
| | 5 | 134 | 58 | NONE | 1192 |
| | 6 | 127 | 27 | NONE | 1212 |
| | 7 | 127 | 25 | NONE | 1212 |
| | 8 | 102 | 27 | NONE | 1308 |
| | 9 | 119 | 20 | NONE | 1242 |
| | 10 | 147 | 42 | NONE | 1154 |
| | 11 | 110 | 19 | NONE | 1275 |
| | 12 | 119 | 35 | NONE | 1242 |
| | 13 | 111 | 43 | NONE | 1272 |
| | 14 | 78 | 13 | NONE | 1446 |
| | 15 | 78 | 15 | NONE | 1443 |
| | 16 | 73 | 7 | NONE | 1482 |
| | 17 | 75 | 10 | NONE | 1466 |
| | 18 | 73 | 9 | NONE | 1488 |
| | 19 | 73 | 18 | NONE | 1488 |
| | 20 | 70 | 12 | NONE | 1512 |
| | 21 | 68 | 12 | NONE | 1530 |
| | 22 | 63 | 4 | NONE | 1580 |
| | 23 | 62 | 9 | NONE | 1590 |
| | 24 | 59 | 7 | NONE | 1623 |
| | 25 | 57 | 6 | NONE | 1650 |

TABLE 2-1

| | | CHEMICAL COMPOSITION (mass %) | | | | | | | | |
|---|---|---|---|---|---|---|---|---|---|---|
| | No. | C | Si | Mn | Al | N | Ti | Cr | Mo | Cu |
| COMPARATIVE EXAMPLES | 26 | 0.68 | 0.16 | 0.12 | 0.005 | 0.0031 | — | 0.19 | — | — |
| | 27 | 1.23 | 0.30 | 0.79 | — | 0.0028 | — | 0.20 | — | — |
| | 28 | 0.80 | 0.12 | 0.12 | — | 0.0026 | 0.006 | 0.19 | — | 0.19 |
| | 29 | 0.72 | 0.65 | 0.13 | — | 0.0035 | 0.012 | 0.19 | 0.05 | — |
| | 30 | 0.81 | 0.17 | 0.09 | — | 0.0035 | — | 0.20 | — | — |
| | 31 | 0.89 | 0.39 | 1.05 | 0.006 | 0.0048 | 0.032 | 0.36 | 0.19 | — |
| | 32 | 0.87 | 0.23 | 0.78 | 0.008 | 0.0045 | 0.029 | 0.35 | 0.35 | — |

TABLE 2-1-continued

| | No. | C | Si | Mn | Al | N | Ti | Cr | Mo | Cu |
|---|---|---|---|---|---|---|---|---|---|---|
| | 33 | 0.82 | 0.29 | 0.12 | 0.012 | 0.0036 | 0.050 | 0.05 | — | 0.20 |
| | 34 | 0.82 | 0.29 | 0.12 | 0.003 | 0.0036 | 0.050 | 0.05 | — | 0.20 |
| | 35 | 0.81 | 0.24 | 0.35 | — | 0.0055 | — | 0.23 | — | 0.03 |
| | 36 | 0.79 | 0.25 | 0.34 | — | 0.0031 | — | 0.54 | 0.21 | — |
| | 37 | 0.81 | 0.23 | 0.46 | 0.003 | 0.0031 | — | 0.42 | 0.12 | 0.06 |
| | 38 | 0.70 | 0.22 | 0.45 | 0.003 | 0.0031 | — | 0.41 | 0.11 | 0.06 |
| | 39 | 0.70 | 0.22 | 0.45 | 0.003 | 0.0031 | — | 0.41 | 0.11 | 0.06 |
| | 40 | 0.70 | 0.22 | 0.45 | 0.003 | 0.0031 | — | 0.41 | 0.11 | 0.06 |
| | 41 | 0.70 | 0.22 | 0.45 | 0.003 | 0.0031 | — | 0.41 | 0.11 | 0.06 |
| | 42 | 0.70 | 0.22 | 0.45 | 0.003 | 0.0031 | — | 0.41 | 0.11 | 0.06 |
| | 43 | 0.70 | 0.22 | 0.45 | 0.003 | 0.0031 | — | 0.41 | 0.11 | 0.06 |
| | 44 | 0.70 | 0.22 | 0.45 | 0.003 | 0.0031 | — | 0.41 | 0.11 | 0.06 |
| | 45 | 0.70 | 0.22 | 0.45 | 0.003 | 0.0031 | — | 0.41 | 0.11 | 0.06 |
| | 46 | 0.70 | 0.22 | 0.45 | 0.003 | 0.0031 | — | 0.41 | 0.11 | 0.06 |

THE SYMBOL "—" REPRESENTS THAT AN ELEMENT CORRESPONDING TO THE SYMBOL IS NOT CONTAINED (OR IS CONTAINED AS AN IMPURITY).
THE REMAINDER OF THE CHEMICAL COMPOSITION OF EACH STEEL WIRE INCLUDES IRON AND IMPURITIES.

TABLE 2-2

| | | No. | V | Co | W | Nb | B | Mg | Ca | REM | Zr |
|---|---|---|---|---|---|---|---|---|---|---|---|
| COMPARATIVE EXAMPLES | | 26 | — | — | — | — | — | — | — | — | — |
| | | 27 | 0.07 | — | — | — | — | — | — | — | — |
| | | 28 | — | — | — | — | 0.0010 | — | — | — | 0.0021 |
| | | 29 | — | 0.13 | — | — | 0.0010 | — | — | 0.0027 | — |
| | | 30 | 0.12 | — | — | — | — | — | 0.0031 | — | — |
| | | 31 | — | — | — | — | — | 0.0038 | — | — | — |
| | | 32 | — | — | — | — | — | 0.0036 | — | — | — |
| | | 33 | 0.05 | — | — | 0.010 | — | — | — | — | — |
| | | 34 | 0.05 | — | — | 0.010 | 0.0340 | — | — | — | — |
| | | 35 | — | — | — | — | — | — | — | — | — |
| | | 36 | — | — | — | — | — | — | — | — | — |
| | | 37 | — | — | 0.055 | 0.017 | — | — | — | — | — |
| | | 38 | — | — | 0.055 | 0.017 | — | — | — | — | — |
| | | 39 | — | — | 0.055 | 0.017 | — | — | — | — | — |
| | | 40 | — | — | 0.055 | 0.017 | — | — | — | — | — |
| | | 41 | — | — | 0.055 | 0.017 | — | — | — | — | — |
| | | 42 | — | — | 0.055 | 0.017 | — | — | — | — | — |
| | | 43 | — | — | 0.055 | 0.017 | — | — | — | — | — |
| | | 44 | — | — | 0.055 | 0.017 | — | — | — | — | — |
| | | 45 | — | — | 0.055 | 0.017 | — | — | — | — | — |
| | | 46 | — | — | 0.055 | 0.017 | — | — | — | — | — |

THE SYMBOL "—" REPRESENTS THAT AN ELEMENT CORRESPONDING TO THE SYMBOL IS NOT CONTAINED (OR IS CONTAINED AS AN IMPURITY).
THE REMAINDER OF THE CHEMICAL COMPOSITION OF EACH STEEL WIRE INCLUDES IRON AND IMPURITIES.

TABLE 2-3

| | | EVALUATION OF CHARACTERISTICS OF STEEL WIRE AFTER DRAWING | | | | | |
|---|---|---|---|---|---|---|---|
| | No. | PEARLITE (area %) | WIRE DIAMETER R (mm) | THICKNESS OF SOFT PORTION (μm) | HARDNESS OF SURFACE LAYER (Hv) | HARDNESS OF CENTER PORTION (Hv) | LAMELLAR SPACING OF SURFACE LAYER (nm) |
| COMPARATIVE EXAMPLE | 26 | 94 | 2.00 | 30 | 300 | 345 | 178 |
| | 27 | 98 | 1.60 | 50 | 330 | 495 | 51 |
| | 28 | 97 | 1.40 | 35 | 316 | 352 | 135 |
| | 29 | 96 | 1.30 | 30 | 389 | 421 | 85 |
| | 30 | 96 | 3.20 | 60 | 371 | 406 | 100 |
| | 31 | 97 | 2.40 | 40 | 416 | 446 | 67 |
| | 32 | 96 | 2.40 | 40 | 410 | 443 | 69 |
| | 33 | 96 | 1.90 | 50 | 367 | 401 | 104 |
| | 34 | 96 | 2.00 | 50 | 359 | 399 | 109 |
| | 35 | 96 | 1.50 | 40 | 365 | 399 | 102 |

TABLE 2-3-continued

| No. | | | | | | |
|---|---|---|---|---|---|---|
| 36 | <u>92</u> | 1.40 | 30 | 374 | 412 | 98 |
| 37 | 95 | 1.50 | <u>0</u> | 364 | 349 | 107 |
| 38 | 95 | 1.50 | 50 | 312 | 346 | 112 |
| 39 | <u>93</u> | 1.50 | 40 | 321 | 345 | 108 |
| 40 | <u>92</u> | 1.50 | 50 | 312 | 346 | 109 |
| 41 | <u>89</u> | 1.50 | 50 | 313 | 344 | 111 |
| 42 | 95 | 1.50 | 50 | 311 | 349 | 108 |
| 43 | 95 | 1.50 | <u>1</u> | 310 | 323 | 107 |
| 44 | 95 | 1.50 | <u>1</u> | 333 | 346 | 123 |
| 45 | <u>93</u> | 1.50 | 50 | 150 | 346 | 78 |
| 46 | 95 | 1.50 | <u>160</u> | 311 | 342 | 123 |

| | | EVALUATION OF CHARACTERISTICS OF STEEL WIRE AFTER DRAWING | | | |
|---|---|---|---|---|---|
| | No. | LAMELLAR SPACING OF CENTER PORTION (nm) | DIFFERENCE IN LAMELLAR SPACING (nm) | WHETHER OR NOT DELAMINATION OCCURRED | TENSILE STRENGTH TS (MPa) |
| COMPARATIVE EXAMPLE | 26 | 197 | 19 | NONE | <u>1050</u> |
| | 27 | 57 | 6 | OCCURRED | 1650 |
| | 28 | 180 | 45 | NONE | <u>1080</u> |
| | 29 | 101 | 16 | OCCURRED | 1314 |
| | 30 | 109 | 8 | OCCURRED | 1281 |
| | 31 | 85 | 18 | OCCURRED | 1397 |
| | 32 | 87 | 18 | OCCURRED | 1390 |
| | 33 | 110 | 6 | OCCURRED | 1275 |
| | 34 | 119 | 10 | OCCURRED | 1264 |
| | 35 | 125 | 23 | OCCURRED | 1212 |
| | 36 | 110 | 12 | OCCURRED | 1275 |
| | 37 | 143 | 37 | OCCURRED | 1165 |
| | 38 | 177 | <u>65</u> | OCCURRED | 1103 |
| | 39 | 143 | 35 | OCCURRED | 1125 |
| | 40 | 142 | 33 | OCCURRED | 1133 |
| | 41 | 141 | 30 | OCCURRED | <u>1070</u> |
| | 42 | 133 | 25 | NONE | <u>1079</u> |
| | 43 | 144 | 37 | OCCURRED | 1133 |
| | 44 | 133 | 10 | OCCURRED | 1150 |
| | 45 | 133 | 55 | OCCURRED | <u>1089</u> |
| | 46 | 135 | 12 | NONE | <u>1089</u> |

In Comparative Example 26 in which the C content was insufficient, the fraction of pearlite was less than 95 area %. As a result, the tensile strength of Comparative Example 26 was lower than 1100 MPa.

In Comparative Example 28 in which the Si content was insufficient, the tensile strength was lower than 1100 MPa.

In Comparative Example 27 in which the C content was excessive and Comparative Example 29 in which the Si content was excessive, delamination occurred due to deterioration in workability.

In Comparative Example 30 in which the Mn content was insufficient, the deoxidation and the fixation of S were not sufficiently performed, and thus delamination occurred.

In Comparative Example 31 in which the Mn content was excessive, delamination occurred due to deterioration in workability.

In Comparative Example 32 in which the Mo content was excessive, drawability deteriorated due to the precipitation of a Mo carbide, and thus delamination occurred.

In Comparative Example 33 in which the Al content was excessive, delamination occurred due to the production of an alumina-based inclusion which caused deterioration in the ductility and drawability of the steel wire.

In Comparative Example 34 in which the B content was excessive, delamination occurred due to the production of coarse $Fe_{23}(CB)_6$ which caused deterioration in the ductility of the steel wire.

In Comparative Example 35 in which the N content was excessive, delamination occurred due to deterioration in ductility.

In Comparative Example 36 in which the Cr content and the Mo content were excessive, a large amount of upper bainite or martensite was produced, the fraction of pearlite decreased, and the drawability deteriorated. Therefore, delamination occurred.

In Comparative Example 37 in which surface layer heating was not performed, the soft portion was not formed. Therefore, workability deteriorated, and thus delamination occurred.

In Comparative Example 38 in which the heating temperature before patenting was excessive, the difference in average lamellar spacing was excessive, and thus delamination occurred.

In Comparative Example 39 in which the heating temperature before patenting was insufficient, the amount of pearlite decreased, and the drawability deteriorated. Therefore, delamination occurred.

In the steel wire of Comparative Example 40 in which the dipping time in the lead bath in the patenting was insufficient, the fraction of pearlite decreased, and delamination occurred.

In the steel wire of Comparative Example 41 in which the dipping time in the lead bath in the patenting was excessive, cementite in pearlite was fragmented, and the amount of pearlite was insufficient. As a result, the drawability and the tensile strength decreased.

In the steel wire of Comparative Example 42 in which the cooling rate after the dipping in the lead bath in the patenting was insufficient, the tensile strength decreased.

In the steel wire of Comparative Example 43 in which the frequency of high-frequency heating which was performed in the surface layer heating was insufficient, the inside of the steel wire was also heated, and the thickness of the soft portion was insufficient. Therefore, delamination occurred.

In the steel wire of Comparative Example 44 in which the surface layer heating temperature in the surface layer heating was insufficient, the hardness of the surface layer did not decrease, and the thickness of the soft portion was insufficient. Therefore, delamination occurred.

In the steel wire of Comparative Example 45 in which the surface layer heating temperature in the surface layer heating was excessive, the inside of the steel wire was also heated. As a result, cementite in pearlite was fragmented, and the amount of pearlite was insufficient. Therefore, the tensile strength decreased.

In the steel wire of Comparative Example 46 in which the period of time required to control the surface layer temperature to be 500° C. or lower in the cooling after the surface layer heating was excessive, the depth of the soft portion was excessive. Therefore, the tensile strength was insufficient.

On the other hand, in Examples 1 to 25 of the present invention, the tensile strength was 1150 MPa or higher, and delamination did not occur.

It was verified from the above results that, according to the present invention, it is possible to provide a steel wire with which a high-strength steel cord having high strength and good workability can be stably manufactured.

INDUSTRIAL APPLICABILITY

According to the present invention, a steel wire having high strength and good workability can be provided. This steel wire is suitable for manufacturing a high-strength steel cord with high yield. The high-strength steel cord is extremely advantageous for reducing the weight of an automobile tire to reduce the fuel consumption of a vehicle. Therefore, the steel wire according to the present invention has industrial applicability.

BRIEF DESCRIPTION OF THE REFERENCE SYMBOLS

10: STEEL WIRE
11: SOFT PORTION
12: CENTER PORTION
13: INDENTATION
14: SURFACE LAYER AVERAGE LAMELLAR SPACING MEASUREMENT REGION
15: CENTER AVERAGE LAMELLAR SPACING MEASUREMENT REGION
16: PORTION OF STEEL WIRE AT DEPTH OF ¼ OF WIRE DIAMETER R
20: PEARLITE
21: FERRITE LAYER
22: CEMENTITE LAYER
23: LINE SEGMENT

The invention claimed is:

1. A steel wire comprising, as a chemical composition, by mass %,
C: 0.70% to 1.20%,
Si: 0.15% to 0.60%,
Mn: 0.10% to 1.00%,
N: 0.0010% to 0.0050%,
Al: 0% to 0.010%,
Ti: 0% to 0.10%,
Cr: 0% to 0.50%,
Co: 0% to 0.50%,
V: 0% to 0.50%,
Cu: 0% to 0.20%,
Nb: 0% to 0.100%,
Mo: 0% to 0.20%,
W: 0% to 0.200%,
B: 0% to 0.0030%,
REM: 0% to 0.0050%,
Ca: 0% to 0.0050%,
Mg: 0% to 0.0050%,
Zr: 0% to 0.0100%, and
a remainder including Fe and impurities,
wherein a wire diameter R of the steel wire is 1.0 mm to 3.5 mm,
a soft portion is formed along an outer circumference of the steel wire,
a Vickers hardness of the soft portion is lower than that of the steel wire at a depth of ¼ of the wire diameter R by a Hv 30 or higher,
a thickness of the soft portion is 5 μm to 0.1×R mm,
a metallographic structure of the steel wire other than the soft portion contains 95% to 100% of pearlite by area %,
an average lamellar spacing of the pearlite in a region from a surface of the steel wire to a depth of 5 μm is less than that of the pearlite at the center of the steel wire,
a difference between the average lamellar spacing of the pearlite in the region from the surface of the steel wire to the depth of 5 μm and the average lamellar spacing of the pearlite at the center of the steel wire is 3 nm to 60 nm, and
a tensile strength is 1100 MPa or higher.

2. The steel wire according to claim 1,
wherein the thickness of the soft portion is 10 μm to 0.08×R mm.

3. The steel wire according to claim 2,
wherein the difference between the average lamellar spacing in the region from the surface of the steel wire to the depth of 5 μm and the average lamellar spacing of the center of the steel wire is 40 nm to 3 nm.

4. The steel wire according to claim 3 further comprising, as the chemical composition, by mass %, one element or two or more elements selected from the group consisting of:
Ti: 0.005% to 0.10%,
Cr: more than 0% to 0.50%,
Co: more than 0% to 0.50%,
V: more than 0% to 0.50%,
Cu: more than 0% to 0.20%,
Nb: more than 0% to 0.100%,
Mo: more than 0% to 0.20%,
W: more than 0% to 0.20%,
B: more than 0% to 0.0030%,
REM: more than 0% to 0.0050%,
Ca: more than 0.0005% to 0.0050%,
Mg: more than 0.0005% to 0.0050%, and
Zr: more than 0.0005% to 0.0100%.

5. The steel wire according to claim 2 further comprising, as the chemical composition, by mass %, one element or two or more elements selected from the group consisting of:
Ti: 0.005% to 0.10%,
Cr: more than 0% to 0.50%,
Co: more than 0% to 0.50%,
V: more than 0% to 0.50%,
Cu: more than 0% to 0.20%,
Nb: more than 0% to 0.100%,
Mo: more than 0% to 0.20%,
W: more than 0% to 0.20%,
B: more than 0% to 0.0030%,
REM: more than 0% to 0.0050%, Ca: more than 0.0005% to 0.0050%,
Mg: more than 0.0005% to 0.0050%, and
Zr: more than 0.0005% to 0.0100%.

6. The steel wire according to claim 1,
wherein the difference between the average lamellar spacing in the region from the surface of the steel wire to the depth of 5 μm and the average lamellar spacing of the center of the steel wire is 40 nm to 3 nm.

7. The steel wire according to claim 6 further comprising, as the chemical composition, by mass %, one element or two or more elements selected from the group consisting of:
Ti: 0.005% to 0.10%,
Cr: more than 0% to 0.50%,
Co: more than 0% to 0.50%,
V: more than 0% to 0.50%,
Cu: more than 0% to 0.20%,
Nb: more than 0% to 0.100%,
Mo: more than 0% to 0.20%,
W: more than 0% to 0.20%,
B: more than 0% to 0.0030%,
REM: more than 0% to 0.0050%,
Ca: more than 0.0005% to 0.0050%,
Mg: more than 0.0005% to 0.0050%, and
Zr: more than 0.0005% to 0.0100%.

8. The steel wire according to claim 1 further comprising, as the chemical composition, by mass %, one element or two or more elements selected from the group consisting of:
Ti: 0.005% to 0.10%,
Cr: more than 0% to 0.50%,
Co: more than 0% to 0.50%,
V: more than 0% to 0.50%,
Cu: more than 0% to 0.20%,
Nb: more than 0% to 0.100%,
Mo: more than 0% to 0.20%,
W: more than 0% to 0.20%,
B: more than 0% to 0.0030%,
REM: more than 0% to 0.0050%,
Ca: more than 0.0005% to 0.0050%,
Mg: more than 0.0005% to 0.0050%, and
Zr: more than 0.0005% to 0.0100%.

9. The steel wire according to claim 1,
wherein the tensile is 1650 MPa to 1100 MPa.

* * * * *